(12) United States Patent
Gantt, Jr. et al.

(10) Patent No.: US 11,307,043 B2
(45) Date of Patent: Apr. 19, 2022

(54) VEHICLE ENERGY MANAGEMENT

(71) Applicant: GM GLOBAL TECHNOLOGY OPERATIONS LLC, Detroit, MI (US)

(72) Inventors: Gary W. Gantt, Jr., Chesterfield Township, MI (US); Varsha K. Sadekar, Detroit, MI (US); Lyall K. Winger, Windsor (CA)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 394 days.

(21) Appl. No.: 16/443,565

(22) Filed: Jun. 17, 2019

(65) Prior Publication Data

US 2020/0393259 A1    Dec. 17, 2020

(51) Int. Cl.
| | |
|---|---|
| *G06G 7/70* | (2006.01) |
| *G06G 7/76* | (2006.01) |
| *G01C 21/34* | (2006.01) |
| *G08G 1/0968* | (2006.01) |
| *B60R 16/03* | (2006.01) |
| *B60L 58/18* | (2019.01) |

(52) U.S. Cl.
CPC .......... *G01C 21/3469* (2013.01); *B60R 16/03* (2013.01); *G08G 1/096833* (2013.01); *B60L 58/18* (2019.02)

(58) Field of Classification Search
CPC ............... G01C 21/3469; B60R 16/03; G08G 1/096833; B60L 58/18
USPC ........................................................ 701/123
See application file for complete search history.

(56) References Cited

U.S. PATENT DOCUMENTS

| | | | |
|---|---|---|---|
| 2014/0330460 A1* | 11/2014 | Schoonmaker | B60L 9/00 701/19 |
| 2016/0325637 A1* | 11/2016 | Payne | B60L 58/24 |
| 2017/0072937 A1* | 3/2017 | Kapadia | B60W 50/0097 |
| 2018/0043784 A1* | 2/2018 | Lewis | H02J 7/00712 |
| 2019/0232944 A1* | 8/2019 | Kai | B60W 20/11 |

* cited by examiner

*Primary Examiner* — Mahmoud S Ismail
(74) *Attorney, Agent, or Firm* — Cantor Colburn LLP

(57) ABSTRACT

A system and method of managing electrical energy consumption and generation of a vehicle. The method includes: determining a vehicle operation schedule for the vehicle, wherein the vehicle operation schedule includes one or more expected vehicle trips that each include a vehicle start location, a vehicle end location, and a time period; obtaining forecasted vehicle trip data based on the vehicle operation schedule; obtaining forecasted vehicle operation data pertaining to the vehicle operation schedule; determining a vehicle energy plan for the vehicle based on the forecasted vehicle trip data and the forecasted vehicle operation data; and causing the vehicle to carry out the vehicle energy plan during the vehicle operation schedule.

20 Claims, 3 Drawing Sheets

VEHICLE ENERGY MANAGEMENT

INTRODUCTION

The present invention relates to forecasting energy usage and/or operation of a vehicle and determining a vehicle energy plan to be carried out during future operation of the vehicle.

Vehicles include hardware and software capable of obtaining and processing various information, including information that is obtained by vehicle system modules (VSMs). The vehicle hardware can be powered by a vehicle battery, such as a 12-volt battery used in a conventional internal combustion engine vehicle. Many newer vehicles now include a primary propulsion system that uses electrical energy stored in a high-voltage vehicle battery. In either approach, recharging of the vehicle battery, whether via an alternator on the vehicle or an external charging station, is required on almost a daily/continuous basis. And, various trip and extended parking profiles bring with them the risk of stranding the vehicle due to an insufficient state of charge.

SUMMARY

It is an object of the invention to improve power management of a vehicle battery by integrating various sources of vehicle information in various ways to help promote more efficient power management of the vehicle battery and/or other power-related systems.

According to one aspect of the invention, there is provided a method of managing electrical energy consumption and generation of a vehicle. The method includes: determining a vehicle operation schedule for the vehicle, wherein the vehicle operation schedule includes one or more expected vehicle trips that each include a vehicle start location, a vehicle end location, and a time period; obtaining forecasted vehicle trip data based on the vehicle operation schedule; obtaining forecasted vehicle operation data pertaining to the vehicle operation schedule; determining a vehicle energy plan for the vehicle based on the forecasted vehicle trip data and the forecasted vehicle operation data; and causing the vehicle to carry out the vehicle energy plan during the vehicle operation schedule.

According to various embodiments, this method may further include any one of the following features or any technically-feasible combination of some or all of these features:
- the vehicle operation schedule is determined at least in part on a vehicle user calendar;
- the vehicle operation schedule is determined based on analyzing previous vehicle trip data concerning one or more previous vehicle trips taken by the vehicle or the vehicle user, and wherein at least one of the expected vehicle trips is determined based on analyzing the previous vehicle trip data;
- at least part of the forecasted vehicle trip data is determined based on measured or observed vehicle trip data pertaining to at least one previous vehicle trip that is coextensive with at least one of the expected vehicle trip(s);
- at least part of the forecasted vehicle operation data is determined based on measured or observed vehicle operation data collected or otherwise obtained during the at least one previous vehicle trip;
- the forecasted vehicle operation data includes expected energy usage data that is determined based on identified patterns among previously-observed actual energy usage metrics of the vehicle, wherein the previously-observed actual energy usage metrics are based on energy-related sensor information that is obtained based on the at least one previous vehicle trip;
- the determining step includes making a determination as to whether the forecasted vehicle operation data indicates a net positive charge factor or a net negative charge factor;
- the determining step includes making a determination as to whether the forecasted vehicle trip data indicates a net positive charge factor or a net negative charge factor;
- the determining step includes selecting a battery management profile based on whether the forecasted vehicle operation data indicates a net positive charge factor or a net negative charge factor and whether the forecasted vehicle trip data indicates a net positive charge factor or a net negative charge factor;
- the selected battery management profile is a charge recovery profile when the forecasted vehicle operation data indicates a net negative charge factor and when the forecasted vehicle trip data indicates a net negative charge factor;
- the selected battery management profile is a charge depletion profile or a charge neutral profile when the forecasted vehicle operation data indicates a net positive charge factor and when the forecasted vehicle trip data indicates a net positive charge factor; and/or
- an overall net charge factor is determined based on the forecasted vehicle operation data and/or forecasted vehicle trip data, wherein the forecasted vehicle operation data is based on vehicle operation microdata and vehicle operation macrodata, and wherein the forecasted vehicle trip data is based on vehicle trip microdata and vehicle trip macrodata.

According to another aspect of the invention, there is provided a method of managing electrical energy consumption and generation of a vehicle. The method includes: determining a vehicle operation schedule for the vehicle, wherein the vehicle operation schedule includes one or more expected vehicle trips that each include a vehicle start location, a vehicle end location, and a time period, and wherein each of the expected vehicle trips includes a plurality of route segments; obtaining forecasted vehicle trip data based on the plurality of route segments of the one or more expected vehicle trips; obtaining forecasted vehicle operation data pertaining to the vehicle operation schedule for the vehicle, wherein the forecasted vehicle operation data includes data based on actual energy usage metrics from one or more previous vehicle trips that are coextensive with at least one of the one or more expected vehicle trips with respect to the vehicle start location and the vehicle end location; determining a vehicle energy plan for the vehicle based on the forecasted vehicle trip data and the forecasted vehicle operation data; and causing the vehicle to carry out the vehicle energy plan.

According to various embodiments, this method may further include any one of the following features or any technically-feasible combination of some or all of these features:
- the forecasted vehicle operation data is based on propulsion system usage data, accessory electronics usage data, and battery system usage data that was collected during the one or more previous vehicle trips;

the forecasted vehicle operation data includes forecasted battery system usage data and wherein the vehicle energy plan is determined based on the forecasted battery system usage data;

the method further includes determining a forecasted energy usage value based on the forecasted vehicle trip data and the forecasted vehicle operation data, and then determining the vehicle energy plan for the vehicle based on the forecasted energy usage value;

the forecasted energy usage value is an overall forecasted energy usage value;

the method is carried out by a backend facility, and wherein the causing step includes sending instructions to the vehicle prior to start of the vehicle operation schedule, wherein the instructions cause the vehicle to carry out the vehicle energy plan; and/or the method is carried out by vehicle electronics of the vehicle, and wherein the vehicle energy plan is carried out at a time prior to the vehicle operation schedule so as to anticipatorily place a vehicle battery in a desired state prior to a first one of the one or more expected vehicle trips.

According to yet another aspect of the invention, there is provided a method of managing electrical energy consumption and generation of a vehicle. The method includes: determining a vehicle operation schedule for the vehicle, wherein the vehicle operation schedule includes one or more expected vehicle trips that each include a vehicle start location, a vehicle end location, and a time period, and wherein each of the expected vehicle trips includes a plurality of route segments; obtaining forecasted vehicle trip data based on the plurality of route segments of the one or more expected vehicle trips; obtaining forecasted vehicle operation data pertaining to the vehicle operation schedule for the vehicle, wherein the forecasted vehicle operation data includes expected energy usage data that is determined based on identified patterns among previously-observed actual energy usage metrics of the vehicle, wherein the previously-observed actual energy usage metrics are based on energy-related sensor information that is obtained based on previous vehicle trips that are coextensive with at least one of the one or more expected vehicle trips; determining a vehicle energy plan for the vehicle based on the forecasted vehicle trip data and the forecasted vehicle operation data; and causing the vehicle to carry out the vehicle energy plan, wherein the vehicle energy plan includes executing a battery charging profile, wherein the battery charging profile is selected from the following: a fast charge recovery profile, a slow charge recovery profile, a charge neutral profile, and a charge depletion profile, and wherein each of the fast charge recovery profile and the slow charge recovery profile are associated with modifying operation of the vehicle so as to provide a net positive inflow into a vehicle battery.

BRIEF DESCRIPTION OF THE DRAWINGS

One or more embodiments of the invention will hereinafter be described in conjunction with the appended drawings, wherein like designations denote like elements, and wherein.

DETAILED DESCRIPTION

The system and method described below enables a vehicle energy plan to be carried out by a vehicle, which is determined based on forecasted vehicle operation data and/or forecasted vehicle trip data. The method and system discussed herein can be used, in some embodiments, to select a battery management profile usable by a vehicle for managing a vehicle battery, as well as other components of the vehicle that take part in generating or storing electrical energy at the vehicle. In some embodiments, a vehicle operation schedule can be determined for the vehicle and with respect to a time period in the future. The vehicle operation schedule can thus include one or more expected (or anticipated, predicted, or forecasted) vehicle trips that are to be taken by the vehicle during the time period in the future. The system and/or method can use previously-measured or collected vehicle operation data and/or vehicle trip data to forecast the energy usage (or the charge depletion or generation with respect to a vehicle battery) during the vehicle operation schedule (i.e., during the time period in the future). Thus, according to at least some embodiments, the system and/or method can anticipate the effects that the vehicle's operation will have during the expected vehicle trip(s), and can anticipatorily select and implement a vehicle energy plan prior to the vehicle operation schedule, which can result in placing the vehicle (and/or the vehicle battery) in a more suitable condition for the upcoming expected vehicle trips, and/or can be used to conserve energy when it is determined that such a suitable condition is already met.

Figure 1:
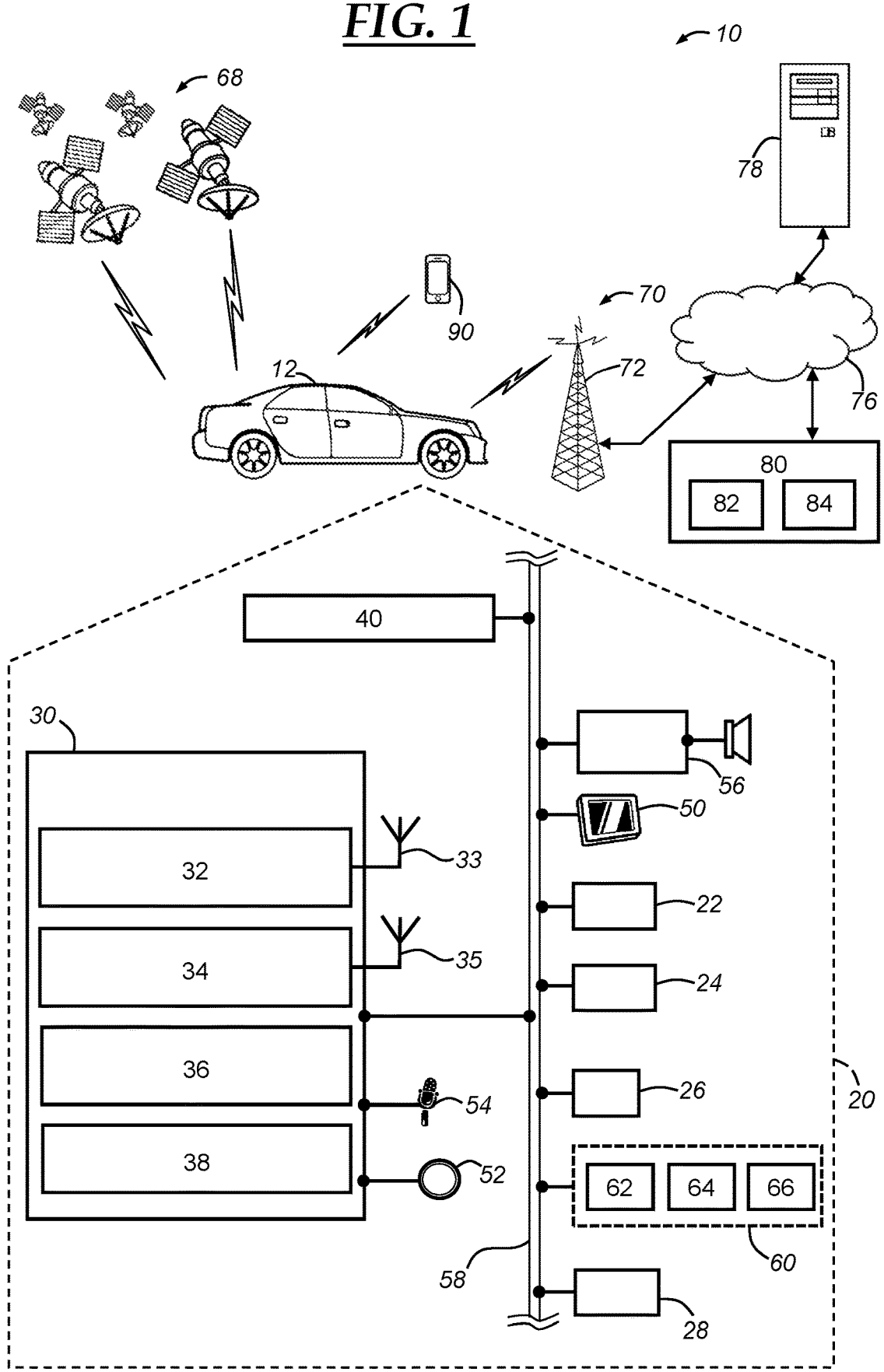
FIG. 1 is a block diagram depicting an embodiment of a communications system that is capable of utilizing the method disclosed herein.

With reference to FIG. 1, there is shown an operating environment that comprises a communications system 10 and that can be used to implement the method disclosed herein. Communications system 10 generally includes a vehicle 12 with a wireless communications device 30 and other VSMs 22-66, a constellation of global navigation satellite system (GNSS) satellites 68, one or more wireless carrier systems 70, a land communications network 76, a computer or server 78, and a vehicle backend services facility 80. It should be understood that the disclosed method can be used with any number of different systems and is not specifically limited to the operating environment shown here. Also, the architecture, construction, setup, and general operation of the system 10 and its individual components are generally known in the art. Thus, the following paragraphs simply provide a brief overview of one such communications system 10; however, other systems not shown here could employ the disclosed methods as well.

Wireless carrier system 70 may be any suitable cellular telephone system. Carrier system 70 is shown as including a cellular tower 72; however, the carrier system 70 may include one or more of the following components (e.g., depending on the cellular technology): cellular towers, base transceiver stations, mobile switching centers, base station controllers, evolved nodes (e.g., eNodeBs), mobility management entities (MMEs), serving and PGN gateways, etc., as well as any other networking components required to connect wireless carrier system 70 with the land network 76 or to connect the wireless carrier system with user equipment (UEs, e.g., which can include telematics equipment in vehicle 12). Carrier system 70 can implement any suitable communications technology, including GSM/GPRS technology, CDMA or CDMA2000 technology, LTE technology, etc. In general, wireless carrier systems 70, their components, the arrangement of their components, the interaction between the components, etc. is generally known in the art.

Apart from using wireless carrier system 70, a different wireless carrier system in the form of satellite communication can be used to provide uni-directional or bi-directional communication with the vehicle. This can be done using one or more communication satellites (not shown) and an uplink transmitting station (not shown). Uni-directional communication can be, for example, satellite radio services, wherein programming content (news, music, etc.) is received by the uplink transmitting station, packaged for upload, and then sent to the satellite, which broadcasts the programming to subscribers. Bi-directional communication can be, for example, satellite telephony services using the one or more communication satellites to relay telephone communications between the vehicle 12 and the uplink transmitting station. If used, this satellite telephony can be utilized either in addition to or in lieu of wireless carrier system 70.

Land network 76 may be a conventional land-based telecommunications network that is connected to one or more landline telephones and connects wireless carrier system 70 to vehicle backend services facility 80. For example, land network 76 may include a public switched telephone network (PSTN) such as that used to provide hardwired telephony, packet-switched data communications, and the Internet infrastructure. One or more segments of land network 76 could be implemented through the use of a standard wired network, a fiber or other optical network, a cable network, power lines, other wireless networks such as wireless local area networks (WLANs), or networks providing broadband wireless access (BWA), or any combination thereof.

Computers 78 (only one shown) can be some of a number of computers accessible via a private or public network such as the Internet. In one embodiment, each such computer 78 can be used for one or more purposes, such as for providing navigational services to a plurality of vehicles and other electronic network computing devices, including vehicle 12 and personal mobile device 90. Other such accessible computers 78 can be, for example: a service center computer where diagnostic information and other vehicle data can be uploaded from the vehicle; a client computer used by the vehicle owner or other subscriber for such purposes as accessing or receiving vehicle data or to setting up or configuring subscriber preferences or controlling vehicle functions; a car sharing server which coordinates registrations from a plurality of users who request to use a vehicle as part of a car sharing service; or a third party repository to or from which vehicle data or other information is provided, whether by communicating with the vehicle 12, backend facility 80, or both. A computer 78 can also be used for providing Internet connectivity such as DNS services or as a network address server that uses DHCP or other suitable protocol to assign an IP address to vehicle 12.

Vehicle backend services facility 80 is a backend facility and is located at a physical location that is located remotely from vehicle 12. The vehicle backend services facility 80 (or "backend facility 80" for short) may be designed to provide the vehicle electronics 20 with a number of different system back-end functions through use of one or more electronic servers 82 and, in some cases, may provide navigation-related services to a plurality of vehicles. The vehicle backend services facility 80 includes vehicle backend services servers 82 and databases 84, which may be stored on a plurality of memory devices. Vehicle backend services facility 80 may include any or all of these various components and, preferably, each of the various components are coupled to one another via a wired or wireless local area network. Backend facility 80 may receive and transmit data via a modem connected to land network 76. Data transmissions may also be conducted by wireless systems, such as IEEE 802.11x, GPRS, and the like. Those skilled in the art will appreciate that, although only one backend facility 80 and one computer 78 are depicted in the illustrated embodiment, numerous remote facilities 80 and/or computers 78 may be used. Moreover, a plurality of backend facilities 80 and/or computers 78 can be geographically distributed and can each coordinate information and services with one another, as those skilled in the art will appreciate.

Servers 82 can be computers or other computing devices that include at least one processor and that include memory. The processors can be any type of device capable of processing electronic instructions including microprocessors, microcontrollers, host processors, controllers, vehicle communication processors, and application specific integrated circuits (ASICs). The processors can be dedicated processors used only for servers 82 or can be shared with other systems. The at least one processor can execute various types of digitally-stored instructions, such as software or firmware, which enable the servers 82 to provide a wide variety of services. In one embodiment, the servers can carry out a vehicle energy usage management application that can determine a vehicle energy plan that is to be carried out by the vehicle 12. This software may be stored in computer-readable memory and can be any suitable computer-readable medium, such as non-transitory, computer-readable memory. For example, the memory can be any of a number of different types of RAM (random-access memory, including various types of dynamic RAM (DRAM) and static RAM (SRAM)), ROM (read-only memory), solid-state drives (SSDs) (including other solid-state storage such as solid state hybrid drives (SSHDs)), hard disk drives (HDDs), and/or magnetic or optical disc drives. For network communications (e.g., intra-network communications, inter-network communications including Internet connections), the servers can include one or more network interface cards (NICs) (including wireless NICs (WNICs)) that can be used to transport data to and from the computers. These NICs can allow the one or more servers 82 to connect with one another, databases 84, or other networking devices, including routers, modems, and/or switches. In one particular embodiment, the NICs (including WNICs) of servers 82 may allow SRWC connections to be established and/or may include Ethernet (IEEE 802.3) ports to which Ethernet cables may be connected to that can provide for a data connection between two or more devices. Backend facility 80 can include a number of routers, modems, switches, or other network devices that can be used to provide networking capabilities, such as connecting with land network 76 and/or wireless carrier system 70.

Databases 84 can be stored on a plurality of memory, such as a powered temporary memory or any suitable non-transitory, computer-readable medium. For example, the memory can be any of a number of different types of RAM (random-access memory, including various types of dynamic RAM (DRAM) and static RAM (SRAM)), ROM (read-only memory), solid-state drives (SSDs) (including other solid-state storage such as solid state hybrid drives (SSHDs)), hard disk drives (HDDs), and/or magnetic or optical disc drives. One or more databases at the backend facility 80 can store various information and can include a vehicle energy usage database, geographical roadway information database, and other vehicle information database(s).

The vehicle energy usage database can include various information or data for use in a vehicle energy usage management application, as discussed more below. The vehicle energy usage data that is stored on the vehicle energy usage database can include historical energy usage data. In at least one embodiment, the historical energy usage data includes actual energy usage metrics from a fleet of vehicles and, in one embodiment, the historical energy usage data can include actual energy usage metrics for the vehicle 12. This historical energy usage data (including actual energy usage metrics) that is specific to a particular vehicle is referred to as vehicle-specific historical energy usage data. The actual energy usage metrics can include an amount of energy that was used by a vehicle for a particular roadway segment, for a particular vehicle trip, and/or at a particular time period. The actual energy usage metrics can be analyzed with respect to various vehicle-related factors and environment-related factors, examples of which are discussed below. Patterns between energy usage (e.g., battery state of charge (SoC), change in SoC) and certain vehicle-related factors and/or environment-related factors can be identified and can be used to inform the vehicle energy usage management application, which can then be used to modify the charging or depletion of the vehicle battery so as to improve the lifetime, performance, and/or efficiency of the battery system 60 and/or of other electrical energy generation or storage components of the vehicle.

As mentioned, the historical energy usage data (including the actual energy usage metrics) can be associated with a particular roadway segment, at least in some embodiments. As used herein, a roadway segment is a segment or portion of a roadway. In some instances, vehicles may travel off-road or on the earth along undesignated roadways; this information can be stored in the vehicle energy usage database and these paths may be considered roadway segments, at least in one embodiment. The actual energy usage metrics and associated roadway segments can also be associated with a particular vehicle (e.g., the vehicle 12), a particular vehicle model (and/or model-year), a particular type of vehicle (e.g., four-door sedan, sport utility vehicle (SUV), car, truck), or other vehicle specification information. The roadway segments can be defined by one or more geographical locations or coordinate pairs. For example, polar coordinates defining a single geographical coordinate pair, radius, and the polar angle can be used to define the roadway segments. In another embodiment, a plurality of geographical coordinate pairs can be used, such as two coordinate pairs. The coordinate pairs can include geographical coordinate information that is received from the vehicle and that is generated at the vehicle through use of global navigation satellite system (GNSS) services (e.g., through use of GNSS receiver 22). The vehicles in the fleet can then report their energy usage (as discussed more below) and their location back to the remote facility, which can store the information into the vehicle energy usage database along with location and time information, which can be used to indicate a roadway segment that the vehicle travelled on during a particular time. In other embodiments, the vehicle location may not be mapped to a particular roadway segment, but the GNSS location or other observed locations can be used instead.

The vehicle energy usage database can associate or cross-reference actual energy usage metrics with roadway segments, with vehicle specification information, and/or with a particular vehicle or fleet of vehicles. The vehicle specification information can include information concerning specifications of the vehicle, such as make, model, model-year, standard features, optional features, aftermarket features, propulsion system types (e.g., electric, hybrid, internal combustion engine (ICE)), battery type, number of battery cells, other vehicle system module (VSM) information (e.g., vehicle sensor information), vehicle networking information, and various other information pertaining to a fleet of vehicles or a particular vehicle, such as the vehicle 12. Also, the roadway segments and/or vehicle specification information can be used as a part of identifying habits or patterns that can affect the consumption and/or generation of energy at the vehicle, and which can be used to inform the vehicle energy usage management application, such as by using these identified habits or patterns to determine a vehicle energy plan for a vehicle operation schedule (or for one or more expected vehicle trips). It should be appreciated that any or all of the information stored in the vehicle energy usage database can be stored at one or more databases at one or more locations or facilities, and which may be operated and/or managed by one or more associated entities, including an OEM of the vehicle(s).

In at least some embodiments, the databases 84 can include a vehicle trip history database that stores information pertaining to previous vehicle trips of the vehicle 12. The data of the vehicle trip history database is referred to as vehicle trip history data and can include vehicle trip parameters of one or more previous trips of the vehicle, as well as actual vehicle trip information of those previous vehicle trips, such as those roadway segments on which the vehicle travelled. This vehicle trip information that is stored in the vehicle trip history database can include actual or inputted start location(s) of one or more previous vehicle trips, actual or inputted end location(s) (or intermediate location(s) or destination(s)) of one or more previous vehicle trips, duration(s) of one or more previous vehicle trips, actual mileage information of one or more previous vehicle trips, suggested or actual route information of one or more previous vehicle trips (e.g., identification (and/or location) of one or more route segments of the previous vehicle trip), etc. In addition, the actual trip information can include weather conditions during the one or more previous vehicle trips, traffic conditions during the one or more previous vehicle trips, other environmental conditions during the one or more previous vehicle trips, etc.

The vehicle trip history data, energy usage data, or any of the other data that may be obtained by a vehicle can be obtained from any of a number of vehicles, such as through communications between a telematics unit of the vehicle and the backend facility 80. In some embodiments, the energy usage data from a first vehicle can be obtained at a second vehicle via vehicle-to-vehicle (V2V) communications. Alternatively or additionally, the personal mobile device 90 can obtain energy usage data vehicle trip history data, energy usage data, or other data can be obtained by an application on the personal mobile device 90. In one embodiment, this data can be crowd-sourced by the personal mobile device receiving this data from one or more other personal mobile devices and/or vehicles. An application stored on the personal mobile device can facilitate the transfer of this data. Also, the vehicle can obtain such data from one or more personal mobile devices.

Moreover, in at least some embodiments, the vehicle-specific historical energy usage data of the vehicle energy usage database can be cross-referenced with the vehicle trip history data of the vehicle trip history database so that historical energy usage information can be determined or obtained for a particular previous trip (or plurality of trips) that was taken by the vehicle. Also, the backend facility 80 can identify vehicle trips that are coextensive with one another. For example, a first vehicle trip may have a start location that is very close (e.g., within 50 meters) to a start location of a second vehicle trip and the first vehicle trip may have an end location that is very close (e.g., within 50 meters) to an end location of the second vehicle trip. Thus, in such an example, the first vehicle trip and the second vehicle trip can be considered to be coextensive with one another. Also, in some embodiments, the date or time (e.g., the time of day and/or the day of the week) can be taken into consideration when identifying coextensive vehicle trips.

Also, according to some embodiments, other similarities among the previous vehicle trips of the vehicle 12 can be identified and used as a part of the method discussed below. For example, the backend facility 80 can, based on the start times and end times of previous vehicle trips, determine environmental conditions (e.g., traffic conditions, weather conditions) experienced during each of the previous vehicle trips. Then, when a planned or expected vehicle trip is determined or anticipated, similarities of the current environmental conditions and those of the previous vehicle trips can be identified and data pertaining to those similar previous vehicle trips (e.g., data of the vehicle energy usage database, data of the vehicle trip history database) can be used as a part of the method discussed below, such as for purposes of selecting a vehicle energy plan to be carried out during the vehicle operation schedule of the planned or expected vehicle trip. In some embodiments, the vehicle energy plan can be learned through use of an artificial intelligence technique, such as through the use of one or more neural networks.

Additionally, in one embodiment, databases 84 include the geographical roadway information database. The geographical roadway information database includes geographical map information including geographical roadway map data that digitally represents geographical areas including roadways on the surface of earth. The geographical roadway map data includes data representing geographical regions and roadways among one or more geographical regions. The geographical roadway map data can include various additional information, such as roadway dimensions and geometries (i.e., information representing geographical areas in which roadways are located), roadway attributes (e.g., speed limit, permitted direction of travel, lane information, traffic signal information), roadway conditions (e.g., present or estimated traffic conditions, predicted and/or observed weather conditions along the roadway), and various other information. Any of the geographic roadway map data can be associated with geographical coordinates or other location-identifying information that can be used to tie the data to a particular geographical point or area. The geographical roadway map data can also include geographical or topographical map data that represents other features of the earth, such as altitude of the earth or estimated grade of the roadway. Any or all of this information can be associated with information stored in the vehicle energy usage database. Moreover, in other embodiments, this information can be stored as a part of the vehicle energy usage database, or may be stored in a separate database at the remote facility 80 or at another server, such as computer 78 or another remote facility. The data of the vehicle energy usage database and the data of the vehicle trip history database can be cross-referenced with the data of the geographical roadway information database based on, for example, the start/end locations or route information of those previous vehicle trips. Other information can be stored at the vehicle backend services facility 80, including account information such as vehicle services subscriber information (e.g., credentials and authentication information), vehicle identifiers, vehicle transactional information, and other vehicle information.

In some embodiments, the historical energy usage data (including the vehicle-specific historical energy usage data) can include data representing habits or patterns of a vehicle with respect to various factors. These various factors can include vehicle-related factors and environment-related factors. Examples of vehicle-related factors include the particular vehicle driver or passengers (e.g., a schedule or calendar for a particular vehicle user, driving habits or patterns of a particular vehicle driver (e.g., rate of acceleration, average speed with respect to the speed limit, use of cruise control, use of autonomous vehicle (AV) features when the vehicle is an AV)), the model of the vehicle, the electrical architecture of the vehicle, vehicle settings that are modifiable by a vehicle user, battery state of charge (SoC), battery temperature, battery start SoC (i.e., the SoC of the battery at the start of a vehicle trip), battery end SoC (i.e., the SoC of the battery at the end of a vehicle trip), battery start temperature (i.e., the temperature of the battery at the start of a vehicle trip), battery end temperature (i.e., the temperature of the battery at the end of a vehicle trip), other battery conditions or sensor data, ignition system conditions or sensor data, vehicle mass or weight (as observed by onboard vehicle sensors, for example), other vehicle sensor data, personal mobile devices at the vehicle and/or connected to the vehicle, optional vehicle features, etc. The vehicle-related factors can be factors that pertain to the operation of a particular vehicle and the environment-related factors can be those that are not tied to a particular vehicle, but relate to the environment of a region in which the vehicle is expected to travel or has traveled. Examples of environment-related factors include a vehicle driver or user's schedule or calendar, predicted weather, observed weather conditions (e.g., as observed using vehicle sensors) the time of day, actual traffic data (either considered alone or with respect to predicted or anticipated traffic conditions for that vehicle trip), observed traffic (e.g., observed using vehicle sensors (e.g., lidar, radar) or wireless communication devices (e.g., V2V communications), observed using edge or fog layer sensors). Any one or more of these types of factors can be analyzed by a computer (e.g., servers 82) and habits or patterns can be identified.

For example, throttle input information (e.g., data of throttle signals generated as a result of a vehicle driver engaging the throttle pedal or other throttle input mechanism) and brake input information (e.g., data of brake signals generated as a result of a vehicle driver engaging the brake pedal or other braking input mechanism) can be analyzed with respect to a particular vehicle driver to determine habits or patterns of the driver's use of the throttle and brakes, such as whether the vehicle driver accelerates fast/hard or slowly, and/or whether the vehicle driver brakes fast/hard or slowly. This data can also be analyzed with respect to other data, such as the vehicle driver's calendar or schedule. For example, the vehicle driver may accelerate faster or more aggressively during rush hour or at times when the driver has reached the end of a traffic jam. Or, in another example, the driver may engage the brakes slower when precipitation is occurring or the roadway conditions are icy. In another example, the driver may accelerate faster, drive at higher speeds, and brake harder when the driver is running late for work or for another scheduled appointment or meeting, which can be observed based on the vehicle driver's schedule. The vehicle driver's schedule can be imported or downloaded to the backend facility (or other part of the system) from a third party application programming interface (API) provided the vehicle driver gives permission and any credential information needed. Or, the vehicle driver can provide their schedule to the vehicle using a mobile application on a personal mobile device (e.g., smartphone), such as personal mobile device 90.

As another example, the vehicle may include certain features such as solar panels that can harvest solar energy for purposes of charging the battery 62 or for otherwise providing electrical energy to the vehicle. The time of day when analyzed in conjunction with estimated or observed weather conditions (e.g., sunny weather, cloudy weather, partly cloudy weather) and other factors pertaining to the vehicle's exposure to the sun can inform the system of an expected amount of energy that is to be harvested by the vehicle at certain times. For example, the vehicle may be parked within a garage (and, thus, having little or negligible exposure to ambient light) during the nighttime, and parked outside and not within a structure (and, thus, having lots of exposure to the sun) during the daytime, such as when the user is at work. These patterns can be used to estimate future parking locations of the vehicle during the vehicle operation schedule so as to inform the vehicle energy usage management application of the likely or anticipated impact as to the energy generation and consumption of the vehicle, at least with respect to this factor.

As yet another example, the schedule of a vehicle driver or user can be downloaded to or otherwise obtained at the backend facility (or other part of the system) from a third party API or other source as discussed above. The schedule can inform the vehicle energy usage management application of expected vehicle trips, probable location(s) of the vehicle, and/or the times at which the vehicle will be parked or driven during the vehicle operation schedule. This information can be used as a part of the vehicle energy usage management application in anticipating the generation and/or consumption of energy at the vehicle, and thus to dictate or inform the use of certain charging profiles or parameters usable by the vehicle, as discussed more below.

The personal mobile device 90 is a mobile device and a short-range wireless communication (SRWC) device (i.e., a device capable of SRWC (e.g., Bluetooth™, Wi-Fi™)) and may include: hardware, software, and/or firmware enabling cellular telecommunications and SRWC as well as other mobile device applications, such as a vehicle user computer application 92. The hardware of the personal mobile device 90 may comprise: a processor and memory for storing the software, firmware, etc. The processor and memory may enable various software applications, which may be preinstalled or installed by the user (or manufacturer). In one embodiment, the personal mobile device 90 includes a vehicle user application 92 that enables a vehicle user to communicate with the vehicle 12 (e.g., such as inputting route or trip parameters) and/or control various aspects or functions of the vehicle, some of which are listed above. Additionally, one or more applications may allow the user to connect with the backend facility 80 or call center advisors.

As used herein, a personal mobile device is a mobile device that is portable by a user, and where the portability of the device is at least partly dependent on the user, such as a wearable device (e.g., a smartwatch), an implantable device, or a handheld device (e.g., a smartphone, a tablet, a laptop). In many embodiments, the personal mobile device is a personal SRWC device. As used herein, a short-range wireless communications (SRWC) device is a device capable of SRWC. In one particular embodiment, the personal mobile device 90 can be a personal cellular SRWC device that includes a cellular chipset and/or cellular connectivity capabilities, as well as SRWC capabilities. Using a cellular chipset, for example, the personal mobile device 90 can connect with various remote devices, including the remote servers 78 and the servers 82 of the backend facility 80 via wireless carrier system 70 and/or land network 76.

The vehicle user application 92 is an application that enables the user to view information pertaining to the vehicle 12. In some embodiments, the vehicle user application 92 enables the user to send commands to the vehicle, such as to remotely start the vehicle's engine (or other primary propulsion system), to lock/unlock vehicle doors, etc. The vehicle user application 92 can also enable the user to view status information concerning the vehicle, such as the status of one or more roadways that are nearby or along a planned route of the vehicle 12. In some embodiments, the vehicle user application 92 can be used to provide information to the backend facility 80, which can include vehicle trip information. In one embodiment, the vehicle user application 92 can provide a schedule or calendar of the vehicle user to the backend facility 80 and/or to the vehicle 12, such as through use of SRWCs.

Vehicle 12 is depicted in the illustrated embodiment as a passenger car, but it should be appreciated that any other vehicle including motorcycles, trucks, sports utility vehicles (SUVs), recreational vehicles (RVs), marine vessels, aircraft, etc., can also be used. Some of the vehicle electronics 20 are shown generally in FIG. 1 and include a global navigation satellite system (GNSS) receiver 22, body control module or unit (BCM) 24, engine control module (ECM) 26, other vehicle system modules (VSMs) 28, a wireless communications device 30, movement sensor(s) 40, vehicle-user interfaces 50-56, and battery system 60. In the illustrated embodiment, the vehicle 12 is an internal combustion engine (ICE) vehicle and uses the battery system 60 for providing electrical power to the vehicle electronics 20. However, in other embodiments, the vehicle 12 can be a hybrid (e.g., a plug-in hybrid electric vehicle (PHEV)) or an electric vehicle. Some or all of the different vehicle electronics 20 may be connected for communication with each other via one or more communication busses, such as bus 58. Communications bus 58 provides the vehicle electronics with network connections using one or more network protocols. Examples of suitable network connections include a controller area network (CAN), a media oriented system transfer (MOST), a local interconnection network (LIN), a local area network (LAN), and other appropriate connections such as Ethernet or others that conform with known ISO, SAE and IEEE standards and specifications, to name but a few. In other embodiments, any one or more of the VSMs can communicate using a wireless network and can include suitable hardware, such as short-range wireless communications (SRWC) circuitry. Of course, any suitable combination of these communication techniques can be used as well.

The vehicle 12 can include numerous vehicle system modules (VSMs) as part of vehicle electronics 20, such as the GNSS receiver 22, BCM 24, ECM 26, wireless communications device 30, movement sensor(s) 40, vehicle-user interfaces 50-56, and battery system 60, as will be described in detail below. The vehicle 12 can also include other VSMs 28 in the form of electronic hardware components that are located throughout the vehicle and, which may receive input from one or more sensors and use the sensed input to perform diagnostic, monitoring, control, reporting, and/or other functions. Each of the VSMs 28 is connected by communications bus 58 to the other VSMs, as well as to the wireless communications device 30. One or more VSMs 28 may periodically or occasionally have their software or firmware updated and, in some embodiments, such vehicle updates may be over the air (OTA) updates that are received from a computer 78 or backend facility 80 via land network 76 and communications device 30. As is appreciated by those skilled in the art, the above-mentioned VSMs are only examples of some of the modules that may be used in vehicle 12, as numerous others are also possible.

Global navigation satellite system (GNSS) receiver 22 receives GNSS signals from a constellation of GNSS satellites. GNSS receiver 22 can be configured to comply with and/or operate according to particular regulations or laws of a given geopolitical region (e.g., country). The GNSS receiver 22 can be configured for use with various GNSS implementations, including global positioning system (GPS) for the United States, BeiDou Navigation Satellite System (BDS) for China, Global Navigation Satellite System (GLO-NASS) for Russia, Galileo for the European Union, and various other navigation satellite systems. For example, the GNSS receiver 22 may be a GPS receiver, which may receive GPS signals from a constellation of GPS satellites 68. And, in another example, GNSS receiver 22 can be a BDS receiver that receives a plurality of GNSS (or BDS) signals from a constellation of GNSS (or BDS) satellites 68. In either implementation, GNSS receiver 22 can include at least one processor and memory, including a non-transitory computer readable memory storing instructions (software) that are accessible by the processor for carrying out the processing performed by the receiver 22.

GNSS receiver 22 may be used to provide navigation and other position-related services to the vehicle operator. Navigation information can be presented on the display 50 (or other display within the vehicle such as an application program on mobile device 90) or can be presented verbally such as is done when supplying turn-by-turn navigation. The navigation services can be provided using a dedicated in-vehicle navigation module (which can be part of GNSS receiver 22 and/or incorporated as a part of wireless communications device 30 or other VSM), or some or all navigation services can be done via the vehicle communications device (or other telematics-enabled device) installed in the vehicle, wherein the position or location information is sent to a remote location for purposes of providing the vehicle with navigation maps, map annotations (points of interest, restaurants, etc.), route calculations, and the like. The position information can be supplied to the vehicle backend services facility 80 or other remote computer system, such as computer 78, for other purposes, such as fleet management and/or for use in the vehicle energy usage management application. Also, new or updated map data, such as that geographical roadway map data stored on databases 84, can be downloaded to the GNSS receiver 22 from the backend facility 80 via vehicle communications device 30, as well as energy usage management information and/or planned route information.

Body control module (BCM) 24 can be used to control various VSMs of the vehicle, as well as obtain information concerning the VSMs, including their present state or status, as well as sensor information. The BCM 24 is shown in the exemplary embodiment of FIG. 1 as being electrically coupled to communication bus 58. In some embodiments, the BCM 24 may be integrated with or part of a center stack module (CSM) and/or integrated with wireless communications device 30. Or, the BCM 24 may be a separate device that is connected to other VSMs via bus 58. The BCM 24 can include a processor and/or memory, which can be similar to processor 36 and memory 38 of wireless communications device 30, as discussed below. The BCM 24 may communicate with wireless device 30 and/or one or more vehicle system modules, such as the movement sensor(s) 40, audio system 56, battery system 60, or other VSMs 28. The BCM 24 may include a processor and memory accessible by the processor. Suitable memory may include non-transitory computer-readable memory that includes various forms of non-volatile RAM and ROM. Software stored in the memory and executable by the processor enables the BCM to direct one or more vehicle functions or operations including, for example, controlling central locking, air conditioning (or other HVAC functions), power mirrors, controlling the vehicle primary mover (e.g., engine, primary propulsion system), and/or controlling various other vehicle modules. For example, the BCM 24 can send signals to other VSMs, such as a request to perform a particular operation or a request for sensor information and, in response, the sensor may then send back the requested information. And, the BCM 24 may receive data from VSMs, including movement sensor information from movement sensor 40, battery information from battery system 60, and various other information from other VSMs.

Additionally, the BCM 24 may provide vehicle state information corresponding to the vehicle state or of certain vehicle components or systems, including the VSMs discussed herein. For example, the BCM 24 may provide the device 30 with information indicating whether the vehicle's primary propulsion system is engaged or in an active (or ready) state (or when the ignition is turned on as received from an engine control module in an ICE vehicle), battery information from the battery system 60, and/or other information regarding the vehicle. The information can be sent to the wireless communications device 30 (or other central vehicle computer) automatically upon receiving a request from the device/computer, automatically upon certain conditions being met, or periodically (e.g., at set time intervals).

As mentioned above, in the illustrated embodiment, the vehicle 12 includes an internal combustion engine (ICE) and is referred to as an ICE vehicle. ICE vehicles may solely use an ICE for propulsion or may use a combination of another energy generator or store (such as a battery) and the ICE. In the case of an ICE vehicle, the vehicle can include an engine control module (ECM) 26 that controls various aspects of engine operation such as fuel ignition and ignition timing. The ECM 26 can be connected to communications bus 58 and may receive operation instructions from BCM 24 or other vehicle system modules, such as wireless communications device 30 or VSMs 28. In one scenario, the ECU may receive a command from the BCM 24 to initiate the ICE. The ECM 26 can also be used to obtain sensor information of the vehicle engine.

The engine control module (ECM) 26 may control various aspects of engine operation such as fuel ignition and ignition timing. The ECM 26 is connected to the communications bus 58 and may receive operation instructions (or vehicle commands) from the BCM 24 or other vehicle system modules. In one scenario, the ECM 26 may receive a command from the BCM 24 (or other VSM) to place the vehicle in a primary propulsion on state (from a primary propulsion off state)—i.e., initiate the vehicle ignition or other primary propulsion system (e.g., a battery powered motor). This command can be provided as a part of (or in response to) a particular battery management profile or vehicle energy plan that is being executed by the vehicle, for example. In at least some embodiments when the vehicle is a hybrid or electric vehicle, a primary propulsion control module can be used instead of (or in addition to) the ECM 26, and this primary propulsion control module can be used to obtain status information regarding the primary mover (including electrical motor(s) and battery information). A primary propulsion off state refers to a state in which the primary propulsion system of the vehicle is off, such as when the internal combustion engine is not running or idling, when a vehicle key is not turned to a START or ON (or accessory) position, or when the power control system for one or more electric motors of an electric vehicle is powered off or not enabled. A primary propulsion on state is a state that is not a primary propulsion off state.

The vehicle 12 includes various onboard vehicle sensors 40 and 64-66. Also, certain vehicle-user interfaces 50-54 can be utilized as onboard vehicle sensors. Generally, the sensors 40, 64-66 can obtain information pertaining to either the operating state of the vehicle (the "vehicle operating state") or the environment of the vehicle (the "vehicle environmental state"). The sensor information can be sent to other VSMs, such as BCM 24 and the vehicle communications device 30, via communications bus 58. Also, in some embodiments, the sensor data can be sent with metadata, which can include data identifying the sensor (or type of sensor) that captured the sensor data, a timestamp (or other time indicator), and/or other data that pertains to the sensor data, but that does not make up the sensor data itself. The "vehicle operating state" refers to a state of the vehicle concerning the operation of the vehicle, which can include the operation of the primary mover (e.g., a vehicle engine, vehicle propulsion motors). Additionally, the vehicle operating state can include information concerning mechanical operations of the vehicle or electrical states of the vehicle. The "vehicle environmental state" refers to a vehicle state concerning the interior of the cabin and the nearby, exterior area surrounding the vehicle. The vehicle environmental state includes behavior of a driver, operator, or passenger, as well as traffic conditions, roadway conditions and features, and statuses of areas nearby the vehicle.

The movement sensors 40 can be used to obtain movement or inertial information concerning the vehicle, such as vehicle speed, acceleration, yaw (and yaw rate), pitch, roll, and various other attributes of the vehicle concerning its movement as measured locally through use of onboard vehicle sensors. The movement sensors 40 can be mounted on the vehicle in a variety of locations, such as within an interior vehicle cabin, on a front or back bumper of the vehicle, and/or on the hood of the vehicle 12. The movement sensors 40 can be coupled to various other VSMs directly or via communications bus 58. Movement sensor data can be obtained and sent to the other VSMs, including BCM 24 and/or wireless communications device 30.

In one embodiment, the movement sensors 40 can include wheel speed sensors that are each coupled to a wheel and that can determine a rotational speed of the respective wheel. The rotational speeds from various wheel speed sensors can then be used to obtain a linear or transverse vehicle speed. Additionally, in some embodiments, the wheel speed sensors can be used to determine acceleration of the vehicle. The wheel speed sensors can include a tachometer that is coupled to a vehicle wheel and/or other rotating member. In some embodiments, wheel speed sensors can be referred to as vehicle speed sensors (VSS) and can be a part of an anti-lock braking (ABS) system of the vehicle 12 and/or an electronic stability control program.

Additionally, the movement sensors 40 can include one or more inertial sensors that can be used to obtain sensor information concerning the acceleration and the direction of the acceleration of the vehicle. The inertial sensors can be a microelectromechanical systems (MEMS) sensor or an accelerometer that obtains inertial information relating to levels of acceleration or braking. In one embodiment, the vehicle 12 can include a plurality of inertial sensors located throughout the vehicle. And, in some embodiments, each of the inertial sensors can be a multi-axis accelerometer that can measure acceleration or inertial force along a plurality of axes. The plurality of axes may each be orthogonal or perpendicular to one another and, additionally, one of the axes may run in the direction from the front to the back of the vehicle 12. Other embodiments may employ single-axis accelerometers or a combination of single- and multi-axis accelerometers. Other types of sensors can be used, including other accelerometers, gyroscope sensors, and/or other inertial sensors that are known or that may become known in the art.

The movement sensors 40 can also include a steering wheel angle sensor that is coupled to a steering wheel of vehicle 12 or a component of the steering wheel, including any of those that are a part of the steering column. The steering wheel angle sensor can detect the angle that a steering wheel is rotated, which can correspond to the angle of one or more vehicle wheels with respect to a longitudinal axis of vehicle 12 that runs from the back to the front. Sensor data and/or readings from the steering wheel angle sensor can be used in a control program that can be executed on a processor of BCM 24 or processor 36.

The movement sensors 40 can include one or more yaw rate sensors that obtain vehicle angular velocity information with respect to a vertical axis of the vehicle. The yaw rate sensors can include gyroscopic mechanisms that can determine the yaw rate and/or the slip angle. Various types of yaw rate sensors can be used, including micromechanical yaw rate sensors and piezoelectric yaw rate sensors. The movement sensors 40 can include various other sensors not explicitly mentioned here, including throttle positions sensors or brake pedal position sensors and other sensors contributing to a change in movement (i.e., a change in direction or propulsion, as indicated by a sensor reading of a vehicle operation or as indicated by receiving an input that (typically) results in a change in direction or propulsion).

The battery system 60 is included as a part of the vehicle electronics 20 and includes a vehicle battery 62, a battery SoC sensor 64, and a battery temperature sensor 66. As mentioned above, in the illustrated embodiment, the vehicle 12 is an ICE vehicle and, in such cases, the vehicle battery 62 can be, for example, a 12-volt battery that provides power to the vehicle electronics 20, which is an ICE automotive battery. The ICE automotive battery can also be a battery that uses other suitable voltages. In embodiments where the vehicle is a hybrid vehicle or an electric vehicle, the vehicle battery 62 can be a traction battery or an electric-vehicle battery (collectively referred to as an "electric-vehicle battery") that is used to provide propulsion for the vehicle 12. When the vehicle 12 is an electric vehicle or a hybrid vehicle, the vehicle battery can be an electric battery pack. The electric battery pack can be a lithium-ion battery pack that includes a plurality of lithium-ion batteries. In the case of a hybrid vehicle or an electric vehicle, the vehicle can, in some embodiments, additionally include a separate lower voltage battery (e.g., 12V) for powering various VSMs and other components of the vehicle electronics 20. Or, in some embodiments where the vehicle is a hybrid vehicle or an electric vehicle, the vehicle may use the electric battery pack for powering various VSMs and other components of the vehicle electronics 20 as well as for providing propulsion to the vehicle 12. Thus, according to various embodiments, the vehicle battery 62 can be an electric-vehicle battery, an ICE automotive battery (or other ICE vehicle battery), or any other battery used by the vehicle for providing electrical power to the vehicle electronics.

The battery state of charge (SoC) sensor 64 is an onboard vehicle sensor and can be any of a variety of electrical components that can measure the state of charge of the vehicle battery 62. In one embodiment, the battery SoC sensor 64 can use (or can be) a voltage sensor, such as a dedicated voltmeter that is attached at a positive terminal of the vehicle battery 62 and at a negative terminal of the battery 62. In another embodiment, the battery SoC sensor 64 can use other techniques, such as chemical methodologies that can be used to measure the specific gravity or pH of the electrolytes contained within the vehicle battery 62, coulomb counting methodologies, Kalman filtering processes (e.g., using voltage and battery temperatures in a Kalman filtering process), pressure methodologies, or a combination thereof. The battery SoC sensor 64 can be configured in various ways, as appreciated by those skilled in the art. The battery SoC sensor 64 can provide sensor information to a computing device of the vehicle 12, such as the wireless communications device 30, for purposes of determining a SoC level, which can be represented as a percentage of the full-charge capacity of the vehicle battery 62.

The battery temperature sensor 66 can be a digital thermometer that is coupled to the vehicle battery 62 such that the battery temperature sensor 66 can measure a temperature of the vehicle battery 62. In other embodiments, the battery temperature sensor 66 can be another temperature sensing device. In one embodiment, the battery temperature sensor 66 can be used to obtain a SoC of the vehicle battery 62, or may be a part of the battery SoC sensor 64 and used in combination with other sensors, such as a voltmeter.

Additionally, the vehicle 12 can include other sensors not mentioned above, including cameras, parking sensors, lane change and/or blind spot sensors, lane assist sensors, ranging sensors (i.e., sensors used to detect the range between the vehicle and another object, such as through use of radar or lidar), other radars, other lidars, tire-pressure sensors, fluid level sensors (including a fuel level sensor), brake pad wear sensors, V2V communication unit (which may be integrated into the wireless communications device 30), rain or precipitation sensors (e.g., infrared light sensor(s) directed toward the windshield (or other window of the vehicle 12) to detect rain or other precipitation based on the amount of reflected light), and interior or exterior temperature sensors.

Wireless communications device 30 is capable of communicating data via short-range wireless communications (SRWC) and/or via cellular network communications through use of a cellular chipset 34, as depicted in the illustrated embodiment. In one embodiment, the wireless communications device 30 is a central vehicle computer that is used to carry out at least part of the method discussed below. In the illustrated embodiment, wireless communications device 30 includes an SRWC circuit 32, a cellular chipset 34, a processor 36, memory 38, and antennas 33 and 35. In one embodiment, wireless communications device 30 may be a standalone module or, in other embodiments, device 30 may be incorporated or included as a part of one or more other vehicle system modules, such as a center stack module (CSM), body control module (BCM) 24, an infotainment module, a head unit, and/or a gateway module. In some embodiments, the device 30 can be implemented as an OEM-installed (embedded) or aftermarket device that is installed in the vehicle. In some embodiments, the wireless communications device 30 is a telematics unit (or telematics control unit) that is capable of carrying out cellular communications using one or more wireless carrier systems 70. The telematics unit can be integrated with the GNSS receiver 22 so that, for example, the GNSS receiver 22 and the wireless communications device (or telematics unit) 30 are directly connected to one another as opposed to being connected via communications bus 58.

In some embodiments, the wireless communications device 30 can be configured to communicate wirelessly according to one or more short-range wireless communications (SRWC) such as any of the Wi-Fi™, WiMAX™, Wi-Fi Direct™, other IEEE 802.11 protocols, ZigBee™, Bluetooth™, Bluetooth™ Low Energy (BLE), or near field communication (NFC). As used herein, Bluetooth™ refers to any of the Bluetooth™ technologies, such as Bluetooth Low Energy™ (BLE), Bluetooth™ 4.1, Bluetooth™ 4.2, Bluetooth™ 5.0, and other Bluetooth™ technologies that may be developed. As used herein, Wi-Fi™ or Wi-Fi™ technology refers to any of the Wi-Fi™ technologies, such as IEEE 802.11b/g/n/ac or any other IEEE 802.11 technology. The short-range wireless communication (SRWC) circuit 32 enables the wireless communications device 30 to transmit and receive SRWC signals, such as BLE signals. The SRWC circuit may allow the device 30 to connect to another SRWC device. Additionally, in some embodiments, the wireless communications device may contain a cellular chipset 34 thereby allowing the device to communicate via one or more cellular protocols, such as those used by cellular carrier system 70. In such a case, the wireless communications device becomes user equipment (UE) usable in carrying out cellular communications via cellular carrier system 70.

The wireless communications device 30 may enable the vehicle 12 to be in communication with one or more remote networks (e.g., one or more networks at backend facility 80 or computers 78) via packet-switched data communication. This packet-switched data communication may be carried out through use of a non-vehicle wireless access point that is connected to a land network via a router or modem. When used for packet-switched data communication such as TCP/IP, the communications device 30 can be configured with a static IP address or can be set up to automatically receive an assigned IP address from another device on the network such as a router or from a network address server.

Packet-switched data communications may also be carried out via use of a cellular network that may be accessible by the device 30. Communications device 30 may, via cellular chipset 34, communicate data over wireless carrier system 70. In such an embodiment, radio transmissions may be used to establish a communications channel, such as a voice channel and/or a data channel, with wireless carrier system 70 so that voice and/or data transmissions can be sent and received over the channel. Data can be sent either via a data connection, such as via packet data transmission over a data channel, or via a voice channel using techniques known in the art. For combined services that involve both voice communication and data communication, the system can utilize a single call over a voice channel and switch as needed between voice and data transmission over the voice channel, and this can be done using techniques known to those skilled in the art.

Processor 36 can be any type of device capable of processing electronic instructions including microprocessors, microcontrollers, host processors, controllers, vehicle communication processors, and application specific integrated circuits (ASICs). It can be a dedicated processor used only for communications device 30 or can be shared with other vehicle systems. Processor 36 executes various types of digitally-stored instructions, such as software or firmware programs stored in memory 38, which enable the device 30 to provide a wide variety of services. For instance, in some embodiments, the processor 36 can execute programs or process data to carry out at least a part of the method discussed herein. The memory 38 may be a temporary powered memory, any non-transitory computer-readable medium, or other type of memory. For example, the memory can be any of a number of different types of RAM (random-access memory, including various types of dynamic RAM (DRAM) and static RAM (SRAM)), ROM (read-only memory), solid-state drives (SSDs) (including other solid-state storage such as solid state hybrid drives (SSHDs)), hard disk drives (HDDs), and/or magnetic or optical disc drives. Similar components to those previously described (processor 36 and/or memory 38, as well as SRWC circuit 32 and cellular chipset 34) can be included in body control module 24, the ECM 26, the battery system 60, and/or various other VSMs that typically include such processing/storing capabilities.

The wireless communications device 30 is connected to the bus 58, and can receive sensor data from one or more onboard vehicle sensors 40, 64-66 and, thereafter, the vehicle can send this data (or other data derived from or based on this data) to other devices or networks, including the vehicle backend services facility 80. And, in another embodiment, the wireless communications device 30 can be incorporated with or at least connected to a navigation system that includes geographical map information including geographical roadway map data and/or a data from an energy usage prediction plan. The navigation system can be communicatively coupled to the GNSS receiver 22 (either directly or via communications bus 58) and can include an on-board geographical map database that stores local geographical map information. This local geographical map information can be provisioned in the vehicle and/or downloaded via a remote connection to a geographical map database/server, such as computer 78 and/or backend facility 80 (including servers 82 and databases 84). The on-board geographical map database can store geographical map information corresponding to a location or region of the vehicle so as to not include a large amount of data, much of which may never be used. Moreover, as the vehicle 12 enters different locations or regions, the vehicle can inform the vehicle backend services facility 80 of the vehicle's location (e.g., obtained via use of GNSS receiver 22) and, in response to receiving the vehicle's new location, the servers 82 can query databases 84 for the corresponding geographical map information, which can then be sent to the vehicle 12.

Vehicle electronics 20 also includes a number of vehicle-user interfaces that provide vehicle occupants with a means of providing and/or receiving information, including visual display 50, pushbutton(s) 52, microphone 54, and audio system 56. As used herein, the term "vehicle-user interface" broadly includes any suitable form of electronic device, including both hardware and software components, which is located on the vehicle and enables a vehicle user to communicate with or through a component of the vehicle. Vehicle-user interfaces 50-54 are also onboard vehicle sensors that can receive input from a user or other sensory information. The pushbutton(s) 52 allow manual user input into the communications device 30 to provide other data, response, or control input. Audio system 56 provides audio output to a vehicle occupant and can be a dedicated, stand-alone system or part of the primary vehicle audio system. According to the particular embodiment shown here, audio system 56 is operatively coupled to both vehicle bus 58 and an entertainment bus (not shown) and can provide AM, FM and satellite radio, CD, DVD and other multimedia functionality. This functionality can be provided in conjunction with or independent of an infotainment module. Microphone 54 provides audio input to the wireless communications device 30 to enable the driver or other occupant to provide voice commands and/or carry out hands-free calling via the wireless carrier system 70. For this purpose, it can be connected to an on-board automated voice processing unit utilizing human-machine interface (HMI) technology known in the art. Visual display or touch screen 50 is preferably a graphics display and can be used to provide a multitude of input and output functions. Display 50 can be a touch screen on the instrument panel, a heads-up display reflected off of the windshield, or a projector that can project graphics for viewing by a vehicle occupant. Various other vehicle-user interfaces can also be utilized, such as the mobile device 90, as the interfaces of FIG. 1 are only an example of one particular implementation.

A user of the vehicle 12 can use one or more vehicle-user interfaces, as discussed more below, to input a destination or other information, such as a calendar or schedule of one or more vehicle users (referred to as a vehicle user schedule). In one embodiment, the user can operate one or more vehicle-user interfaces 50-56, which can then deliver inputted information to other VSMs, such as the wireless communications device 30. The wireless communications device 30 can then send this information to the backend facility 80 using the cellular chipset 34 or other communications means. For example, the user can use the touchscreen display 50 to enter a desired destination to which the user would like to travel to. The destination can include a physical address (e.g., 1234 Main Street, Central City, Mich.) or can include a point of interest or other geographical indicator. The destination can be represented in many forms, such as through geographical coordinates or textual data. The vehicle start location can be specified by the user via the vehicle-user interfaces, may be determined based on the vehicle user schedule, or may be determined or preset to be the vehicle's current location, which can be determined using GNSS receiver 22 or through use of other location services. This information can be sent using the wireless communications device 30 (e.g., through SRWC circuitry 32 or cellular chipset 34) to the backend facility 80 or other remote computing system (e.g., computer 78), which can provide navigational information to the vehicle 12. This navigational information can be displayed on the display 50, or may be presented via use of other vehicle-user interfaces that can be used for presenting output. The navigational information can provide one or more route segments as well as geographical roadway map data.

Figure 2:
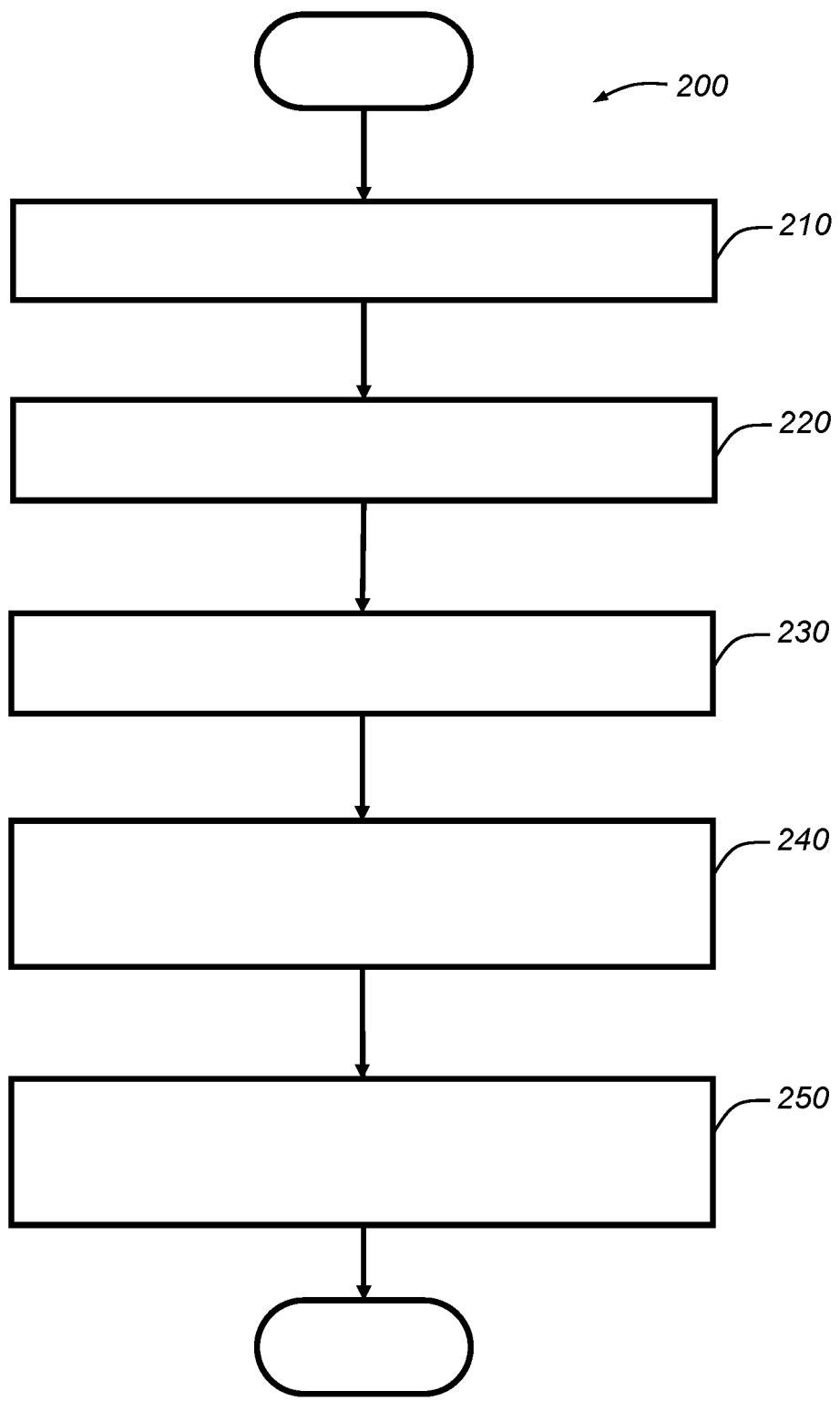
FIG. 2 is a flowchart of an embodiment of a method of managing electrical energy consumption and generation of a vehicle.

With reference to FIG. 2, there is shown a method 200 of managing electrical energy consumption and generation of a vehicle. The method 200 can be carried out by the backend facility 80 using one or more servers 82 and, in at least some embodiments, can be carried out using a plurality of servers. In another embodiment, the method 200 can be carried out at the vehicle 12. In other embodiments, the method 200 can be carried out by a combination of the servers 82 of the backend facility 80 and the vehicle 12. In general, the method 200 is described as being carried out by a vehicle energy usage management application. Although this vehicle energy usage management application is referred to as a single application, the method 200 may be carried out by one or more computer applications, any one or more of which can be executed by the vehicle 12 and/or the backend facility 80. The steps of the method 200 can be carried out according to any technically feasible order, as appreciated by those skilled in the art.

The method 200 begins with step 210, wherein a vehicle operation schedule is determined for the vehicle. Generally, the vehicle operation schedule is an expected or forecasted schedule of the vehicle and, according to many embodiments, includes one or more expected vehicle trips, which each include a vehicle start location, a vehicle end location, and a time period. The vehicle start location and the vehicle end location can include or be indicated by a physical address (e.g., 1234 Main St.), a geographical coordinate location (e.g., GNSS coordinates), or other information that identifies a particular location. The time period of each of the expected vehicle trips can include a start time and an end time for the expected vehicle trip. Additionally, the vehicle operation schedule can include an overall start time (which may be the present time as of carrying out step 210, for example) and an overall end time (which can be a predetermined time later than the overall start time (e.g., three (3) days past the overall start time)).

The vehicle operation schedule can be determined based on a variety of sources, such as by a vehicle user schedule or calendar, and one or more previous vehicle operation schedules. A previous vehicle operation schedule is an observed schedule of the vehicle, which can include one or more actual vehicle trips, vehicle start locations, vehicle end locations, and/or time periods. A vehicle user schedule is a schedule of one or more vehicle users, and can be determined based on obtaining an electronic schedule of a vehicle user from another application (e.g., a mobile application of the personal mobile device 90, a web application). In one embodiment, the vehicle user schedule can be an electronic schedule that includes dates, times, and locations of various meetings, appointments, other obligations, or other events that a vehicle user plans on attending or is expected to attend.

In one embodiment, the vehicle user schedule is obtained from a third party application, such as a mobile application that is executed on the personal mobile device 90, which can be a smartphone, for example. The vehicle user schedule can be obtained by the vehicle interfacing with the personal mobile device 90 (e.g., via a SRWC connection such as a Bluetooth™ connection), or by the vehicle or backend facility 80 interfacing with a third party server that hosts the application used by the vehicle user to manage the vehicle user schedule. The vehicle user schedule can be represented by data (referred to as vehicle user schedule data) that is provided to the vehicle 12 or the backend facility 80 and which can then be used as a part of determining the vehicle operation schedule.

For example, the vehicle user schedule may indicate a variety of appointments or meetings that include a start time, an end time, and a location. The vehicle energy usage management application can use the vehicle user schedule to identify one or more expected vehicle trips, as well as the vehicle start location, the vehicle end location, and the time period for each of these expected vehicle trips. The vehicle operation schedule can also be determined or adjusted based on previous vehicle operation schedules. Moreover, vehicle-related information and/or environment-related information (or information pertaining to the vehicle-related factors and/or environment-related factors) can be taken into account when determining one or more expected vehicle trips, or when otherwise determining the vehicle operation schedule. In one embodiment, patterns of vehicle user travel and vehicle operation can be identified through analyzing the previous vehicle operation schedules in conjunction with certain vehicle-related information and/or environment-related information. For example, the vehicle user schedule may indicate a first appointment at a first location and a second appointment at a second location after the first appointment, and previous data that was collected by the system may indicate that the vehicle user historically or usually walks or bikes between the first location and the second location when it is sunny out or above a certain temperature, and drives between the first location and the second location when it is raining out or below a certain temperature. The vehicle energy usage management application can use various techniques to identify such patterns and can use these patterns in determining the vehicle operation schedule. Once the vehicle operation schedule is determined, the method 200 continues to step 220.

In step 220, forecasted vehicle trip data is obtained based on the vehicle operation schedule. The forecasted vehicle trip data includes forecasted or predicted parameters or other information pertaining to the location and the travel of the vehicle during the vehicle operation schedule. The forecasted vehicle trip data can thus include information concerning one or more roadway segments of the one or more expected vehicle trips as well as information concerning one or more parking locations in which the vehicle is expected to be parked at or stored during the vehicle operation schedule. According to various embodiments, the forecasted vehicle trip data includes weather information (e.g., expected or predicted weather), traffic conditions (e.g., expected or predicted traffic volumes or other conditions, road construction and maintenance, closure of roadways), roadway dimensions and geometries (i.e., information representing geographical areas in which roadways are located (e.g., incline of the roadway, altitude of the roadway, roll angle of the roadway, radius of curvature of the roadway)), roadway attributes (e.g., speed limit, permitted direction of travel, lane information, traffic signaling information (e.g., traffic signaling types and their locations, traffic signaling schedules, expected or average delays due to traffic signaling)), time of day related information (e.g., expected or average sun exposure), etc. The method 200 then continues to step 230.

In step 230, forecasted vehicle operation data pertaining to the vehicle operation schedule is obtained. This forecasted vehicle operation data is data concerning the expected or forecasted operation of the vehicle during the vehicle operation schedule. The forecasted vehicle energy data can be used to provide insight into expected consumption and generation of electrical energy at the vehicle during the vehicle operation schedule. According to at least some embodiments, the forecasted vehicle operation data is based on propulsion system usage data, accessory electronics usage data, and battery system usage data. The propulsion system usage data, the accessory electronics usage data, and/or the battery system usage data can be information that was collected during previous vehicle trips of the vehicle, including previous vehicle trips that are coextensive with at least one of the expected vehicle trip(s). In one embodiment, the propulsion system usage data, the accessory electronics usage data, and/or the battery system usage data can include averages of certain metrics, such as averages of actual energy usage metrics, as well as other statistical measures of these metrics. In one embodiment, the propulsion system usage data, the accessory electronics usage data, and/or the battery system usage data can be taken from a predetermined number of previous vehicle trips (e.g., previous and coextensive vehicle trips) so that recent data is used. The forecasted vehicle operation data can be generated based on this information, and can include a collection of information that can be analyzed so as to determine an impact on the battery system (or other electric power consumption or generation system/mechanism of the vehicle) as expected during (or forecasted for) the vehicle operation schedule. The propulsion system usage data, the accessory electronics usage data, and/or the battery system usage data can be collected by the vehicle during various vehicle trips and stored on memory at the vehicle, or sent to the backend facility 80 and stored in databases 84, for example. This data can be stored as historical vehicle operation data and used to inform the vehicle energy usage management application of expected or forecasted vehicle operation for coextensive vehicle trips.

The propulsion system usage data is data that relates to the propulsion system of the vehicle and that can be used to provide insight as to the expected or forecasted effect the propulsion system has on the vehicle battery (or other electrical energy storage or generation components) during the vehicle operation schedule. In some embodiments, forecasted propulsion system usage data can be generated based on previous propulsion system usage data that was collected or obtained as a part of one or more previous vehicle trips, such as during one or more previous and coextensive vehicle trips. The forecasted propulsion system usage data is data concerning the expected or forecasted operation of the propulsion system (e.g., the ECM 24, other primary mover) during the vehicle operation schedule. Additionally, or alternatively, forecasted propulsion system usage data can be generated based on other factors. According to various embodiments, the forecasted propulsion system usage data can be at least partly based on the forecasted vehicle trip data, previous vehicle trip data, data in the geographical roadway information database, and/or data in other vehicle information database.

Various techniques can be used to obtain forecasted propulsion system usage data, which can include carrying out statistical techniques or machine learning techniques on previous propulsion system usage data. The previous propulsion system usage data can include sensor data from the ECM 24, movement data from movement sensor 40, sensor data from another VSM that is related to the propulsion of the vehicle, commands carried out by the ECM 24, data sent or otherwise observed over one or more communication busses (e.g., bus 58), throttle commands or signals, brake commands or signals, etc. For example, certain patterns or habits of the vehicle operator concerning their use of the throttle and brakes can inform the vehicle energy usage management application of an amount of charge that will be gained or lost during the vehicle operation schedule. Although a single factor, such as use of the throttle, may not inform the vehicle energy usage management application of overall energy usage during the vehicle operation schedule, the analysis of numerous factors can inform the vehicle energy usage management application of an expected or forecasted amount of energy usage during the vehicle operation schedule. In some embodiments, forecasted propulsion system usage data need not directly be determined as certain techniques (e.g., neural networks, machine learning) could be employed that map previous propulsion system usage data to expected impacts on the vehicle battery during the vehicle operation schedule.

Also, in some embodiments, the forecasted propulsion system usage data can include data concerning expected vehicle primary propulsion off events, expected vehicle primary propulsion on events, expected vehicle idling events, driving patterns of the vehicle driver (e.g., fast/hard acceleration, use of cruise control, tendency to change lanes) (which can be based on movement sensor data from the movement sensors 40 or other vehicle sensors), etc. As mentioned above, the propulsion system usage data can include sensor data (or other vehicle-related data) pertaining to the propulsion of the vehicle that is collected from one or more previous vehicle trips that are coextensive with an expected vehicle trip of the vehicle operation schedule. For example, the vehicle operation schedule can include an expected vehicle trip from a vehicle user's residence to the vehicle user's workplace, and object detection sensor data or movement sensor data collected during previous vehicle trips between the vehicle user's residence to the vehicle user's workplace can be used to indicate expected traffic conditions and expected propulsion operation during the expected vehicle trip. This propulsion system usage data can thus be used to inform the vehicle energy usage management application of expected or forecasted impacts that these propulsion-related operations may or likely will have on the vehicle battery. As another example, a vehicle user may leave their vehicle idling during periods between vehicle trips as observed through collecting data from previous, coextensive vehicle trips. Thus, expected vehicle idling events (which can be represented as a part of forecasted propulsion system usage data) can be identified and used to inform the vehicle energy usage management application of expected or forecasted impacts that these idling event(s) may or likely will have on the vehicle battery.

The accessory electronics usage data includes data that relates to electronic components of the vehicle that are not a part of the propulsion system of the vehicle or of the battery system of the vehicle and that can be used to provide insight as to the expected or forecasted effect these electronic components have on the vehicle battery (or other electrical energy storage or generation components) during the vehicle operation schedule. In some embodiments, forecasted accessory electronics usage data can be generated based on previous accessory electronics usage data that was collected or obtained as a part of one or more previous vehicle trips, such as during one or more previous and coextensive vehicle trips. The forecasted accessory electronics usage data is data concerning the expected or forecasted operation of the electronic components of the vehicle that are not a part of the propulsion system of the vehicle or of the battery system of the vehicle during the vehicle operation schedule. Additionally, or alternatively, forecasted accessory electronics usage data can be generated based on other factors. In one example concerning the generation of forecasted accessory electronics usage data, information pertaining to the use of an infotainment unit (e.g., radio, audio system) can be collected during one or more previous vehicle trips. This infotainment usage information of previous vehicle trip(s) (an example of previous accessory electronics usage data) that are coextensive with any one of the one or more expected vehicle trips can be obtained and then used to determine forecasted accessory electronics usage data, which can indicate certain expected use of various electronics (other than those of the propulsion system and the battery system). This expected use of these various electronics can then be used to assess their effect on the vehicle battery during the vehicle operation schedule. In other embodiments, forecasted accessory electronics usage data need not directly be determined as certain techniques (e.g., neural networks, machine learning) could be employed that map previous accessory electronics usage data to expected impacts on the vehicle battery during the vehicle operation schedule.

The battery system usage data is data that relates to the battery system of the vehicle and that provides insight as to the expected or forecasted state of the vehicle battery during the vehicle operation schedule. For example, the battery system usage data can include battery system information, such as a battery state of charge (SoC), a battery temperature, a battery start SoC, a battery end SoC, battery start temperature, battery end temperature, other battery conditions or sensor data. This battery system information can be currently-observed information (e.g., a battery SoC at the time of carrying out step 230) and/or information from previous vehicle trips, such as those that are coextensive with one or more of the expected vehicle trips. The battery system usage data can also include information concerning electric loads, such as output power provided by the vehicle battery 62 to one or more components of the vehicle electronics 20. For example, the vehicle can track information concerning the use of one or more electronic devices of the vehicle electronics (which can be part of the accessory electronics usage data) along with the amount of energy used by the electronic device(s) (which can be part of the battery system usage data), and then can use certain analysis techniques to determine the impact that the use of certain electronic components has on the vehicle battery.

In at least some embodiments, forecasted battery system usage data is generated based on previous battery system usage data, which is battery system usage data that is collected from one or more previous vehicle trips. In some embodiments, the forecasted battery system usage data is generated based on previous and coextensive vehicle trips. According to various embodiments, the forecasted battery system usage data can be at least partly based on the forecasted vehicle trip data, previous vehicle trip data, data in the geographical roadway information database, and/or data in other vehicle information database. In some embodiments, forecasted battery system usage data need not directly be determined as certain techniques (e.g., neural networks, machine learning) could be employed that map previous battery system usage data to expected impacts on the vehicle battery during the vehicle operation schedule. The method 200 continues to step 240.

Figure 3:
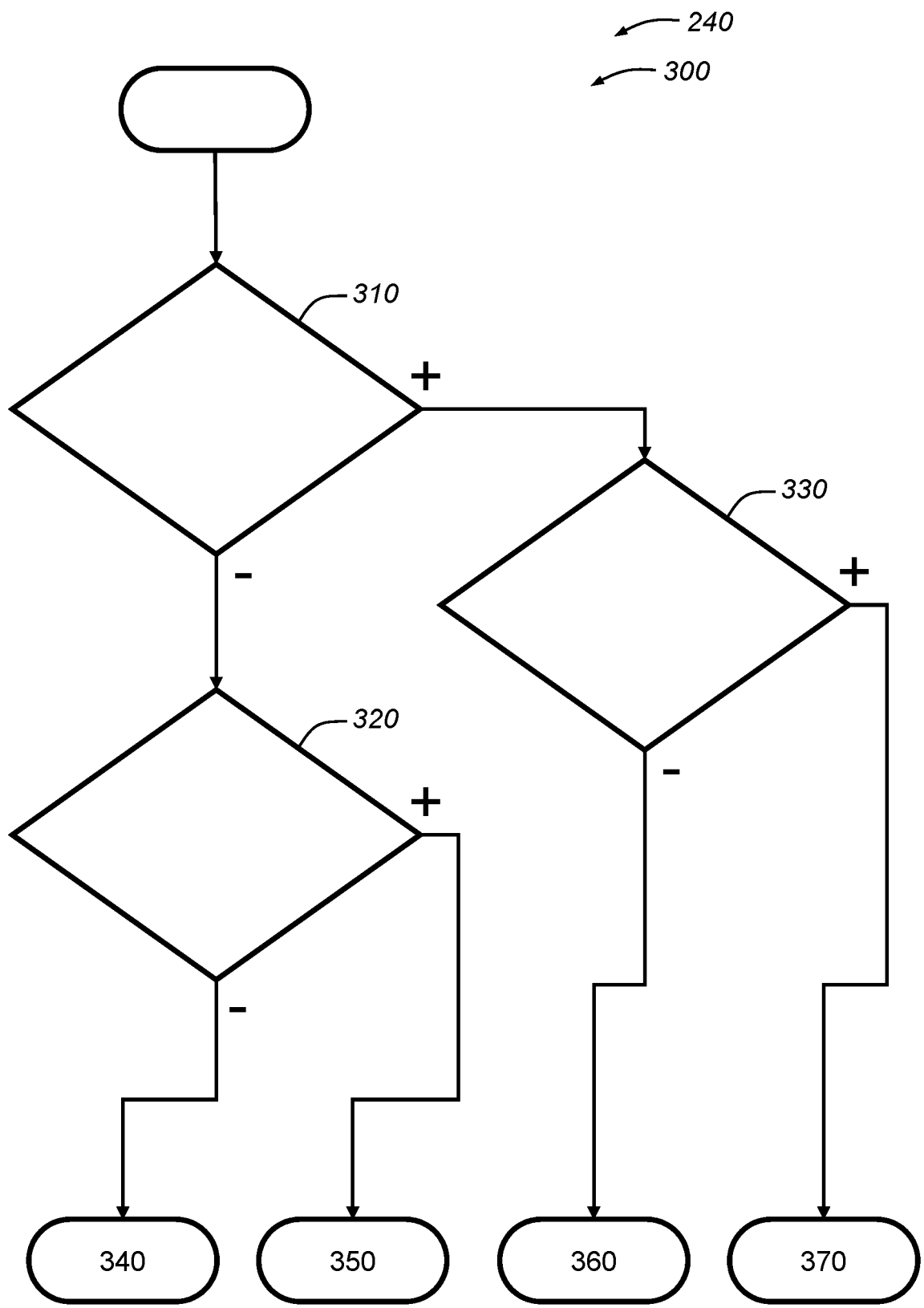
FIG. 3 is a flowchart of an embodiment of a process of determining a vehicle energy plan based on forecasted vehicle trip data and forecasted vehicle operation data.

In step 240, a vehicle energy plan for the vehicle is determined based on the forecasted vehicle trip data and the forecasted vehicle operation data. The vehicle energy plan is used to inform the vehicle electronics of operations that are to be carried out during the vehicle operation schedule. In one embodiment, the vehicle energy plan can include particular commands that direct one or more actions to be carried out by one or more VSMs of the vehicle. In another embodiment, the vehicle energy plan can specify a particular battery management profile or mode usable by the vehicle during the vehicle operation schedule. In at least some embodiments, the vehicle energy plan is based on forecasting or predicting the energy consumption and/or the energy generation of the vehicle battery during the vehicle operation schedule. In one embodiment, one or more vehicle operation factors pertaining to the forecasted vehicle operation (as indicated by the forecasted vehicle operation data) and/or one or more vehicle trip factors pertaining to one or more expected vehicle trips (as indicated by the forecasted vehicle trip data) are used to determine one or more forecasted (or predicted) energy usage values (or indicators). These forecasted energy usage values can be any value or data that indicates a forecasted amount of energy usage. In one embodiment, a forecasted energy usage value is determined for each such vehicle operation factor and/or each such vehicle trip factor, and these values can then be used in determining a net (or overall) forecasted energy usage value. This overall forecasted energy usage value can be determined in a variety of ways, such as through summing all of the forecasted energy usage values. An example of determining a vehicle energy plan based on the forecasted vehicle trip data and the forecasted vehicle operation data is provided below as process 300 (FIG. 3).

In other embodiments, the forecasted vehicle trip data and the forecasted vehicle operation data can be analyzed as a whole, such as through using this data as input into a neural network that maps such inputs to a vehicle energy plan or an overall forecasted energy value. For example, a neural network can be trained using various data, such as the historical energy usage data, other data in the vehicle energy usage database, data in the geographical roadway information database, and data in other vehicle information database(s). Other machine learning techniques as well as other analysis techniques can be used for determining a vehicle energy plan for the vehicle.

In one embodiment, the vehicle energy plan can specify a particular battery management profile or mode (referred to as a "battery management profile"), as mentioned above. The particular battery management profile can be selected from a plurality of battery management profiles, and which can include at least one charge recovery profiles and at least one charge depletion profiles. A charge recovery profile is a battery management profile in which the net charge (or SoC) of the vehicle battery increases over time, and a charge depletion profile is a battery management profile in which the net charge (or SoC) of the vehicle battery decreases over time. In other embodiments, the plurality of battery management profiles can include a neutral charge profile. A neutral charge profile is a battery management profile in which the net charge (or SoC) of the vehicle battery stays approximately the same over time. In one embodiment, such as that which is described below with respect to FIG. 3, the plurality of battery management profiles from which the particular battery management profile is selected includes two charge recovery profiles: a fast (or aggressive) charge recovery profile and a slow (or moderate) charge recovery profile. In at least some embodiments, each of the plurality of battery management profiles, when executed by the vehicle, cause a certain amount of voltage to be provided to the vehicle battery. In one embodiment, in the charge recovery profiles, the amount of voltage provided to the vehicle battery is positive with respect to the vehicle battery's rated voltage (e.g., 12V) and, in the charge depletion profiles, the amount of voltage provided to the vehicle battery is negative with respect to the vehicle battery's rated voltage.

The vehicle energy plan can specify certain parameters to be used or instructions to be carried out by the battery system 60, and/or by other vehicle system modules that generate electrical energy. For example, the vehicle energy plan can specify when regenerative braking is used to generate electrical energy, or when an alternator is used for charging the vehicle battery. In another example, the vehicle energy plan can cause the vehicle to enter an idle boost mode during periods of time when the vehicle is idling, which is a mode in which the revolutions per minute (RPMs) is increased during idling so as to charge the vehicle battery via an alternator. Also, in some embodiments, the vehicle energy plan can inhibit (or restrict) or enable certain vehicle functions that deplete the charge of the vehicle battery. For example certain vehicle sensors or entertainment functions that are not critical to vehicle propulsion and that use more than a negligible amount of electrical energy can be disabled when in a charge recovery mode. The method 200 continues to step 250.

In step 250, the vehicle energy plan for the vehicle is carried out or caused to be carried out. The vehicle energy plan is carried out by the vehicle and, in embodiments where the steps 210-240 are carried out by the backend facility 80, the backend facility 80 can cause the vehicle energy plan to be carried out by the vehicle by sending a vehicle energy plan command to the vehicle. This vehicle energy plan command commands the vehicle to carry out the vehicle energy plan, and can be sent to the vehicle via the land network 76 and/or the wireless carrier system 70. The vehicle may carry out the vehicle energy plan through use of one or more VSMs, including those of the battery system 60. Also, in some embodiments, the vehicle energy plan may specify certain vehicle operations or parameters used for certain vehicle operations and, thus, carrying out the vehicle energy plan can include carrying out these specified vehicle operations or carrying out certain vehicle operations according to the specified parameters. The method 200 then ends.

With reference to FIG. 3, there is shown an embodiment of a process 300 of determining a vehicle energy plan based on forecasted vehicle trip data and forecasted vehicle operation data. The process 300 can be carried out in place of step 240 of the method 200 (FIG. 2). The steps of the process 300 can be carried out according to any technically feasible order, as appreciated by those skilled in the art.

The process 300 starts with step 310 in which a determination is made as to whether the forecasted vehicle operation data indicates a net positive charge factor or a net negative charge factor. As used herein, a positive charge factor represents that the vehicle battery will gain charge or will be suitably charged. As used herein, a negative charge factor represents that the vehicle battery will lose charge or is not suitably charged. As used herein, a neutral charge factor represents that the vehicle battery will not gain or lose charge. In one embodiment, each of the charge factors (each of which can be a positive charge factor, a negative charge factor, or a neutral charge factor) can be provided a particular charge value that represents the extent to which the vehicle battery will gain charge or lose charge, or a value weighing in favor of whether a more aggressive battery management profile should be used or not. In one embodiment, the charge factors can indicate actual charge values. A net charge factor represents the summation of one or more charge factors or an overall result based on one or more charge factors, such as a result when one or more charge factors are considered together or as a whole. A net positive charge factor is when the overall result of the charge factor(s) is positive, a net negative charge factor is when the overall result of the charge factor(s) is negative, and a net neutral charge factor is when the overall result of the charge factor(s) is neutral.

When certain portions of the forecasted vehicle operation data indicates that the vehicle battery is to gain charge or that the vehicle battery will be suitably charged, then those portions can be designated or assigned a positive charge factor. When certain portions of the forecasted vehicle operation data indicates that the battery is to lose charge or that the vehicle battery is not suitably charged, then those portions can be designated or assigned a negative charge factor. For example it can be determined whether the vehicle battery will be charged or depleted during the vehicle operation schedule, as well as whether the overall charge during the trip and/or at the end of the trip will be above a threshold value that is considered to represent a suitable state of charge (SoC) of the vehicle battery. A plurality of charge factors can be determined based on individual portions of the forecasted vehicle operation data, and then these plurality of charge factors can be summed or otherwise combined to obtain a net charge factor.

In one example, the forecasted vehicle operation data can include one or more values pertaining to the forecasted operation of the propulsion system (as represented in the forecasted propulsion system usage data), to the forecasted operation of the battery system (as represented in the forecasted battery system usage data), and/or to the forecasted accessory electronics of the vehicle (as represented in the forecasted accessory electronics usage data). In at least one embodiment, these forecasted values can be averages of previous values collected during previous and/or coextensive vehicle trips. As a part of step 310, one or more of these forecasted values can be compared to a predetermined threshold value (or other predetermined data or values) to determine whether the forecasted value(s) indicate(s) the vehicle battery will gain charge or will have charge depleted, and/or whether the charge of the vehicle battery is (or is likely) to be above a suitable charge threshold.

For example, the amount of time the ICE is off may be associated with depletion of charge from the vehicle battery when the amount of time is above a certain threshold, and the amount of depletion may be proportional to the amount of time that the ICE is off. Thus, based on the forecasted amount of ICE off time (i.e., the forecasted or estimated amount of time the ICE will be off during the vehicle operation schedule), a determination can be made (with respect to this factor alone) as to whether charge will be depleted and/or how much charge will be depleted. Based on this determination, a positive charge factor, a negative charge factor, or a neutral charge factor can be assigned to this portion of the forecasted vehicle operation data. As another example, the previous battery SoC (or the forecasted battery SoC at the time of starting the vehicle operation schedule) may be below a particular threshold amount (e.g., a suitable charge value), and this portion of the forecasted vehicle operation data can be assigned a negative charge factor. That is, even considering that the previous battery SoC (or the forecasted battery SoC) may not influence whether the vehicle battery will receive charge during the vehicle operation schedule, this value indicates that charge should be provided to the vehicle battery and can be assigned a negative charge factor since, as will be shown below, a negative charge factor weighs in favor of a battery management profile that provides more charge to the vehicle battery. When it is determined that the forecasted vehicle operation data indicates a net negative charge factor, the process 300 continues to step 320. When it is determined that the forecasted vehicle operation data indicates a net positive charge factor, the process 300 continues to step 330.

In steps 320 and 330, it is determined whether the forecasted vehicle trip data indicates a net positive charge factor or a net negative charge factor. These steps are similar to step 310 except that the forecasted vehicle trip data is used. When certain portions of the forecasted vehicle trip data indicates that the vehicle battery is to gain charge or that the vehicle battery will be suitably charged, then those portions can be designated or assigned a positive charge factor. When certain portions of the forecasted vehicle trip data indicates that the vehicle battery is to lose charge or that the vehicle battery will not be suitably charged, then those portions can be designated or assigned a negative charge factor. For example, with respect to certain portions of the forecasted vehicle trip data, it can be determined whether these portions indicate or are associated with a scenario or likelihood that the vehicle battery will be charged or depleted during the vehicle operation schedule, as well as whether it is more likely that the overall charge during the trip and at the end of the trip will be above a threshold value that is considered to represent a suitable state of charge (SoC) of the vehicle battery. It should be appreciated that the suitable SoC of the vehicle battery differs for various types of batteries, vehicle electrical architectures, etc., and that these values can be developed for the particular vehicle and/or model. A plurality of charge factors can be determined based on individual portions of the forecasted vehicle trip data and then these plurality of charge factors can be summed or otherwise combined to obtain a net charge factor.

In one example, the forecasted vehicle trip data can include one or more values pertaining to one or more expected trips that are to be taken (or expected to be taken) by the vehicle as a part of the vehicle operation schedule. In at least one embodiment, these forecasted values can be averages of previous values collected during previous and/or coextensive vehicle trips. As a part of steps 320 and/or 330, one or more of these forecasted values can be compared to one or more predetermined threshold values (or other predetermined data or values) to determine whether the forecasted value(s) indicate(s) the vehicle battery will gain charge or will have charge depleted, and/or whether the charge of the vehicle battery is (or is likely) to be above a suitable charge threshold during the vehicle operation schedule. Certain metrics or other information associated with charging or depleting charge of the vehicle battery can be identified and assigned a charge factor. For example, the vehicle operation schedule may indicate an expected number of traffic stops. A threshold number of traffic stops can be compared to the expected number of traffic stops and, when the threshold number of traffic stops is exceeded, a negative charge factor can be indicated or provided, which can include, for example, a particular negative value that is based on the expected number of traffic stops. As another example, an expected amount of highway driving time (or expected amount of driving time over a particular speed) can be determined based on the forecasted vehicle trip data. The expected amount of highway driving time (or expected amount of driving time over a particular speed) can be compared to a threshold value and, when the expected amount of highway driving time (or expected amount of driving time over a particular speed) exceeds the threshold value, a positive charge factor can be indicated or provided, which can include a particular positive value that is based on the expected amount of highway driving time since, for example, driving at extended periods of time at highway speeds can provide charge to a vehicle battery via an alternator.

In step 320, when it is determined the forecasted vehicle trip data indicates a net negative charge factor, the process 300 continues to step 340. In step 320, when it is determined the forecasted vehicle trip data indicates a net positive charge factor, the process 300 continues to step 350. In step 330, when it is determined the forecasted vehicle trip data indicates a net negative charge factor, the process 300 continues to step 360. In step 330, when it is determined the forecasted vehicle trip data indicates a net positive charge factor, the process 300 continues to step 370.

Each of steps 340-370 corresponds to a battery management profile. The illustrated embodiment of the process 300 thus is used to select a particular battery management profile from a plurality of battery management profiles. In the illustrated embodiment, step 340 and step 350 are both examples of a charge recovery profile, with step 340 being a fast (or aggressive) charge recovery profile and step 350 being a slow (or moderate) charge recovery profile. Also, in the illustrated embodiment, step 360 is a neutral charge profile and step 370 is a charge depletion profile. The selected battery management profile can thus be used as a part of the vehicle energy plan, which is carried out by the vehicle (see step 250 of FIG. 2).

In some embodiments, the vehicle energy plan can include a plurality of selected battery management profiles, each of which are selected for a particular time period of the vehicle operation schedule. In one embodiment, the vehicle operation schedule can be divided into different time periods (e.g., a first time period beginning at the start of the vehicle operation schedule and ending at the start of a second start period that ends at the end of the vehicle operation schedule) and the process 300 can be carried out for each of these different time periods. The vehicle energy plan can thus include a plurality of selected battery management profiles, each of which are selected for a particular time period of the vehicle operation schedule.

In some embodiments, the vehicle can monitor the vehicle battery status during the vehicle operation schedule and can update the battery management profile based on the monitoring of the vehicle battery. The vehicle battery status can include one or more different metrics pertaining to the vehicle battery, such as the state of charge (SoC) of the vehicle battery, the temperature of the battery, etc. Also, other portions of the vehicle electronics can be monitored during the vehicle operation schedule as well, such as operation of the propulsion system and/or operation of the accessory electronics. The vehicle energy plan can be updated in real time based on the monitored operation of the vehicle, and this updating can include selecting a new battery management profile and/or changing parameters used as a part of the battery management profile. For example, when the vehicle determines that there is an unexpected charge surplus for the vehicle battery, the vehicle energy plan can transition to a less aggressive charge profile, such as from a fast (or aggressive) charge recovery profile (step 340) to a slow (or moderate) charge recovery profile (step 350), or from a slow (or moderate) charge recovery profile (step 350) to a charge neutral profile (step 360), for example. In making this determination, the vehicle energy usage management application (or other application) can compare a forecasted battery SoC to an observed or measured battery SoC, where the observed or measured battery SoC is observed or measured during the vehicle operation schedule, such as through use of the battery SoC sensor 64. Also, when the vehicle determines that there is an unexpected charge loss for the vehicle battery, the vehicle energy plan can transition to a more aggressive charge profile, such as from a slow (or moderate) charge recovery profile (step 350) to a fast (or aggressive) charge recovery profile (step 340), or from a charge depletion profile (step 370) to a charge neutral profile (step 360), for example.

In some embodiments, the forecasted vehicle trip data can include and/or be determined based on short-term vehicle trip data (also referred to as "vehicle trip microdata"), which is vehicle trip data that is descriptive of information occurring at a particular time. Also, or alternatively, the forecasted vehicle trip data can include and/or be determined based on long-term vehicle trip data (also referred to as "vehicle trip macrodata"), which is vehicle trip data that is descriptive of information occurring over a long period of time, such as multiple days or weeks. For example, current or expected traffic conditions during a particular time (or shortened time period) is considered short-term vehicle trip data while a recurring flight schedule of a vehicle user is considered long-term vehicle trip data.

In some embodiments, the forecasted vehicle operation data can include and/or be determined based on short-term vehicle operation data (also referred to as "vehicle operation microdata"), which is vehicle operation data that is descriptive of information occurring at a particular time. Also, or alternatively, the forecasted vehicle operation data can include and/or be determined based on long-term vehicle operation data (also referred to as "vehicle operation macrodata"), which is vehicle operation data that is descriptive of information occurring over a long period of time, such as multiple days or weeks. For example, the current or expected state of charge (SoC) during a particular time is considered short-term vehicle operation data while an average SoC over a three-week period is considered long-term vehicle operation data.

In one embodiment, the method 200, the process 300, and/or step(s) or parts thereof can be implemented in one or more computer programs (or "applications", or "scripts") embodied in one or more computer readable mediums and including instructions usable (e.g., executable) by one or more processors of the one or more computers of one or more systems. The computer program(s) may include one or more software programs comprised of program instructions in source code, object code, executable code, or other formats. In one embodiment, any one or more of the computer program(s) can include one or more firmware programs and/or hardware description language (HDL) files. Furthermore, the computer program(s) can each be associated with any program related data and, in some embodiments, the computer program(s) can be packaged with the program related data. The program related data may include data structures, look-up tables, configuration files, certificates, or other relevant data represented in any other suitable format. The program instructions may include program modules, routines, programs, functions, procedures, methods, objects, components, and/or the like. The computer program(s) can be executed on one or more computers, such as on multiple computers that are in communication with one another.

The computer program(s), including the vehicle energy usage management application, can be embodied on computer readable media (e.g., memory of the vehicle 12 (e.g., memory 38, other vehicle memory, memory of the remote server 78, memory of the backend facility 80, a combination thereof), which can be non-transitory and can include one or more storage devices, articles of manufacture, or the like. Exemplary computer readable media include computer system memory, e.g. RAM (random access memory), ROM (read only memory); semiconductor memory, e.g. EPROM (erasable, programmable ROM), EEPROM (electrically erasable, programmable ROM), flash memory; magnetic or optical disks or tapes; and/or the like. The computer readable medium may also include computer to computer connections, for example, when data is transferred or provided over a network or another communications connection (either wired, wireless, or a combination thereof). Any combination(s) of the above examples is also included within the scope of the computer-readable media. It is therefore to be understood that the method can be at least partially performed by any electronic articles and/or devices capable of carrying out instructions corresponding to one or more steps of the disclosed method.

It is to be understood that the foregoing is a description of one or more embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "e.g.," "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation. In addition, the term "and/or" is to be construed as an inclusive OR. Therefore, for example, the phrase "A, B, and/or C" is to be interpreted as covering any one or more of the following: "A"; "B"; "C"; "A and B"; "A and C"; "B and C"; and "A, B, and C."

What is claimed is:

1. A method of managing electrical energy consumption and generation of a vehicle, comprising the steps of:

determining a vehicle operation schedule for the vehicle, wherein the vehicle operation schedule includes one or more expected vehicle trips that each include a vehicle start location, a vehicle end location, and a time period, and wherein each of the expected vehicle trips includes a plurality of route segments;

obtaining forecasted vehicle trip data based on the based on the plurality of route segments of the one or more expected vehicle trips included with the vehicle operation schedule for the vehicle, wherein the forecasted vehicle trip data includes expected energy usage data that is determined based on identified patterns among previously-observed actual energy usage metrics of the vehicle, wherein the previously-observed actual energy usage metrics are based on energy-related sensor information that is obtained based on previous vehicle trips that are coextensive with at least one of the one or more expected vehicle trips;

obtaining forecasted vehicle operation data pertaining to the vehicle operation schedule;

determining a vehicle energy plan for the vehicle based on the forecasted vehicle trip data and the forecasted vehicle operation data, the vehicle energy plan including a plurality of different battery management profiles configured to control the charging and depletion of the battery of the vehicle; and causing the vehicle to carry out the vehicle energy plan during the vehicle operation schedule, wherein the plurality of different battery management profiles includes a charge recovery profile, a charge neutral profile, and a charge depletion profile, the charge recovery profile being a battery management profile that includes a fast charge recovery profile and a slow charge recovery profile each of which increases a net charge of the battery over time, the charge neutral profile is a battery management profile in which the net charge of the battery is maintained approximately the same over time, and the charge depletion profile is a battery management profile in which the net charge of the battery decreases over time.

2. The method of claim 1, wherein the vehicle operation schedule is determined at least in part on a vehicle user calendar.

3. The method of claim 1, wherein the vehicle operation schedule is determined based on analyzing previous vehicle trip data concerning one or more previous vehicle trips taken by the vehicle or the vehicle user, and wherein at least one of the expected vehicle trips is determined based on analyzing the previous vehicle trip data.

4. The method of claim 1, wherein at least part of the forecasted vehicle trip data is determined based on measured or observed vehicle trip data pertaining to at least one previous vehicle trip that is coextensive with at least one of the expected vehicle trip(s).

5. The method of claim 4, wherein at least part of the forecasted vehicle operation data is determined based on measured or observed vehicle operation data collected or otherwise obtained during the at least one previous vehicle trip.

6. The method of claim 5, wherein the forecasted vehicle operation data includes expected energy usage data that is determined based on identified patterns among previously-observed actual energy usage metrics of the vehicle, wherein the previously-observed actual energy usage metrics are based on energy-related sensor information that is obtained based on the at least one previous vehicle trip.

7. The method of claim 1, wherein the determining step includes making a determination as to whether the forecasted vehicle operation data indicates a net positive charge factor or a net negative charge factor.

8. The method of claim 7, wherein the determining step includes making a determination as to whether the forecasted vehicle trip data indicates a net positive charge factor or a net negative charge factor.

9. The method of claim 8, wherein the determining step includes selecting a battery management profile based on whether the forecasted vehicle operation data indicates a net positive charge factor or a net negative charge factor and whether the forecasted vehicle trip data indicates a net positive charge factor or a net negative charge factor.

10. The method of claim 9, wherein the selected battery management profile is a charge recovery profile when the forecasted vehicle operation data indicates a net negative charge factor and when the forecasted vehicle trip data indicates a net negative charge factor.

11. The method of claim 1, wherein an overall net charge factor is determined based on the forecasted vehicle operation data and/or forecasted vehicle trip data, wherein the forecasted vehicle operation data is based on vehicle operation microdata and vehicle operation macrodata, and wherein the forecasted vehicle trip data is based on vehicle trip microdata and vehicle trip macrodata.

12. The method of claim 1, wherein each of the charge recovery profile, the charge neutral profile, and the charge depletion profile causes an amount of voltage to be provided to the battery, and wherein when invoking the charge recovery profile the amount of voltage provided to the battery is positive with respect to a rated voltage of the battery, and when invoking the charge depletion profile the amount of voltage provided to the battery is negative with respect to the rated voltage of the battery.

13. A method of managing electrical energy consumption and generation of a vehicle, comprising the steps of:

determining a vehicle operation schedule for the vehicle, wherein the vehicle operation schedule includes one or more expected vehicle trips that each include a vehicle start location, a vehicle end location, and a time period, and wherein each of the expected vehicle trips includes a plurality of route segments;

obtaining forecasted vehicle trip data based on the plurality of route segments of the one or more expected vehicle trips;

obtaining forecasted vehicle operation data pertaining to the vehicle operation schedule for the vehicle, wherein the forecasted vehicle operation data includes expected energy usage data that is based on previously-observed actual energy usage metrics corresponding energy-related sensor information that is obtained from one or more previous vehicle trips that are coextensive with at least one of the one or more expected vehicle trips with respect to the vehicle start location and the vehicle end location;

determining a vehicle energy plan for the vehicle based on the forecasted vehicle trip data and the forecasted vehicle operation data; and causing the vehicle to carry out the vehicle energy plan that includes a plurality of different battery management profiles, wherein the plurality of different battery management profiles includes a charge recovery profile, a charge neutral profile, and a charge depletion profile, the charge recovery profile being a battery management profile that includes a fast charge recovery profile and a slow charge recovery profile each of which increases a net charge of the battery over time, the charge neutral profile is a battery management profile in which the net charge of the battery is maintained approximately the same over time, and the charge depletion profile is a battery management profile in which the net charge of the battery decreases over time.

14. The method of claim 13, wherein the forecasted vehicle operation data is based on propulsion system usage data, accessory electronics usage data, and battery system usage data that was collected during the one or more previous vehicle trips.

15. The method of claim 14, wherein the forecasted vehicle operation data includes forecasted battery system usage data and wherein the vehicle energy plan is determined based on the forecasted battery system usage data.

16. The method of claim 15, wherein the method further includes determining a forecasted energy usage value based on the forecasted vehicle trip data and the forecasted vehicle operation data, and then determining the vehicle energy plan for the vehicle based on the forecasted energy usage value.

17. The method of claim 16, wherein the forecasted energy usage value is an overall forecasted energy usage value.

18. The method of claim 16, wherein the method is carried out by a backend facility, and wherein the causing step includes sending instructions to the vehicle prior to start of the vehicle operation schedule, wherein the instructions cause the vehicle to carry out the vehicle energy plan.

19. The method of claim 16, wherein the method is carried out by vehicle electronics of the vehicle, and wherein the vehicle energy plan is carried out at a time prior to the vehicle operation schedule so as to anticipatorily place the battery in a desired state prior to a first one of the one or more expected vehicle trips.

20. A method of managing electrical energy consumption and generation of a vehicle, comprising the steps of:

determining a vehicle operation schedule for the vehicle, wherein the vehicle operation schedule includes one or more expected vehicle trips that each include a vehicle start location, a vehicle end location, and a time period, and wherein each of the expected vehicle trips includes a plurality of route segments;

obtaining forecasted vehicle trip data based on the plurality of route segments of the one or more expected vehicle trips;

obtaining forecasted vehicle operation data pertaining to the vehicle operation schedule for the vehicle, wherein the forecasted vehicle operation data includes expected energy usage data that is determined based on identified patterns among previously-observed actual energy usage metrics of the vehicle, wherein the previously-observed actual energy usage metrics are based on energy-related sensor information that is obtained based on previous vehicle trips that are coextensive with at least one of the one or more expected vehicle trips;

determining a vehicle energy plan for the vehicle based on the forecasted vehicle trip data and the forecasted vehicle operation data; and causing the vehicle to carry out the vehicle energy plan, wherein the vehicle energy plan includes executing a battery charging profile, wherein the battery charging profile is selected from the following: a fast charge recovery profile, a slow charge recovery profile, a charge neutral profile, and a charge depletion profile, wherein the fast charge recovery profile and slow charge recovery profile increases a net charge of the battery over time, the charge neutral profile maintains a net charge of the battery over time, and the charge depletion profile decreases the net charge of the battery over time.

* * * * *